(12) United States Patent
Song et al.

(10) Patent No.: US 11,378,839 B2
(45) Date of Patent: Jul. 5, 2022

(54) TRANSPARENT DISPLAY PANEL, PREPARATION METHOD THEREOF AND DISPLAY DEVICE

(71) Applicant: BOE Technology Group Co., Ltd., Beijing (CN)

(72) Inventors: Xiaoxin Song, Beijing (CN); Feng Zhang, Beijing (CN); Wenqu Liu, Beijing (CN); Zhijun Lv, Beijing (CN); Liwen Dong, Beijing (CN); Zhao Cui, Beijing (CN); Detian Meng, Beijing (CN); Libo Wang, Beijing (CN); Dongfei Hou, Beijing (CN); Qi Yao, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/213,824

(22) Filed: Mar. 26, 2021

(65) Prior Publication Data

US 2022/0019108 A1 Jan. 20, 2022

(30) Foreign Application Priority Data

Jul. 20, 2020 (CN) .......................... 202010698041.8

(51) Int. Cl.
<br>*G02F 1/1335* (2006.01)
<br>*F21V 8/00* (2006.01)
<br>*G02F 1/1368* (2006.01)
<br>*G02F 1/1343* (2006.01)

(52) U.S. Cl.
<br>CPC ....... *G02F 1/133553* (2013.01); *G02B 6/005* (2013.01); *G02F 1/133565* (2021.01); *G02F 1/133616* (2021.01); *G02F 1/1368* (2013.01); *G02F 1/13439* (2013.01); *G02F 1/133512* (2013.01); *G02F 2203/01* (2013.01)

(58) Field of Classification Search
<br>CPC ........ G02F 1/133553; G02F 1/133565; G02F 1/133616; G02F 1/133512; G02F 1/13439; G02F 1/1368; G02F 2203/01; G02B 6/005
<br>See application file for complete search history.

(56) References Cited

U.S. PATENT DOCUMENTS 6,151,089 A * 11/2000 Yang .................... G02B 6/0048
<br>349/113
6,163,405 A 12/2000 Chang et al.
9,030,627 B1 5/2015 Baldwin
(Continued)

FOREIGN PATENT DOCUMENTS

CN 104977793 A 10/2015
CN 110673388 A 1/2020

*Primary Examiner* — Mariam Qureshi
<br>(74) *Attorney, Agent, or Firm* — ArentFox Schiff LLP; Michael Fainberg

(57) ABSTRACT

The present disclosure can provide a transparent display panel, a preparation method thereof and a display device. The transparent display panel includes a bearing layer disposed between a base substrate and a liquid crystal layer and including a plurality of concave structures, and a plurality of reflecting structures located between the bearing layer and the liquid crystal layer, where an orthographic projection of the concave structure on the base substrate covers an orthographic projection of one or more reflecting structures on the base substrate.

17 Claims, 20 Drawing Sheets

(56) References Cited

U.S. PATENT DOCUMENTS

2003/0048398 A1* 3/2003 Maeda .............. G02F 1/133553
349/113
2009/0167991 A1* 7/2009 Young .................. G02F 1/1336
349/69
2015/0286124 A1 10/2015 Kim et al.

* cited by examiner

TRANSPARENT DISPLAY PANEL, PREPARATION METHOD THEREOF AND DISPLAY DEVICE

CROSS REFERENCE TO RELATED APPLICATIONS

The present application is based on and claims priority under 35 U.S.C. 119 to Chinese Patent Application No. 202010698041.8 filed on Jul. 20, 2020, in the China National Intellectual Property Administration, the entire contents of which are incorporated herein by reference.

FIELD

The present disclosure relates to the field of display, in particular to a transparent display panel, a preparation method thereof and a display device.

BACKGROUND

With the development of the display technology, a transparent display panel is proposed as a novel display, in such transparent display panel, displayed images can be seen from its front surface, and objects on the back of the transparent display panel can also be seen via the panel. The transparent display panel has numerous potential applications, for example, windows of buildings, automobiles, or display windows in shopping malls. In addition to these large device applications, small device such as a handheld tablet computer can also benefit from the transparent display panel.

SUMMARY

Embodiments of the present disclosure provide a transparent display panel, a preparation method thereof and a display device, to achieve transparent display.

An embodiment of the present disclosure provides a transparent display panel, including a plurality of sub-pixels, and further including:

a base substrate;

a light guide substrate, arranged opposite to the base substrate, and including a plurality of light entering regions and a plurality of light emitting regions spaced from the plurality of light entering regions, where each sub-pixel includes a light entering region and a light emitting region;

a liquid crystal layer, disposed between the base substrate and the light guide substrate;

a bearing layer, disposed between the base substrate and the liquid crystal layer, and including a plurality of concave structures, where each sub-pixel includes a concave structure; and a plurality of reflecting structures, located between the bearing layer and the liquid crystal layer, where an orthographic projection of the concave structure on the base substrate covers an orthographic projection of one or more reflecting structures on the base substrate; where in a same sub-pixel, one or more reflecting structures reflect incident light to obtain emitted light, so that the emitted light is emitted by penetrating through the light emitting region of the light guide substrate, and the incident light is incident on the one or more reflecting structures, through the liquid crystal layer, from the light entering region of the light guide substrate.

In some embodiments, a cross section, in a direction parallel to a row of the plurality of sub-pixels and perpendicular to the base substrate, of the concave structure is a triangle.

In some embodiments, the triangle has a first edge, a second edge and a third edge connected in sequence; where the first edge and the second edge are located at side edges of the concave structure, and the third edge is located at an opening of the concave structure; and a length of the second edge is greater than a length of the first edge, and an included angle between the second edge and the third edge ranges from 20° to 40°.

In some embodiments, the bearing layer includes a plurality of sub-bearing layers disposed at intervals; where each sub-pixel includes a sub-bearing layer, and an orthographic projection of the sub-bearing layer on the base substrate covers the orthographic projection of the concave structure on the base substrate.

In some embodiments, a material of the bearing layer is a photoresist with light shading performance.

In some embodiments, the transparent display panel further includes: a transistor layer disposed between the base substrate and the bearing layer, and including a plurality of thin film transistors; and a driving electrode layer disposed between the transistor layer and the bearing layer, and including a plurality of transparent pixel electrodes;

where each sub-pixel includes a thin film transistor and a transparent pixel electrode, and in a same sub-pixel, the thin film transistor and the transparent pixel electrode are electrically connected to each other.

In some embodiments, in a same sub-pixel, the orthographic projection of the sub-bearing layer on the base substrate covers an orthographic projection of the thin film transistor on the base substrate; and/or in a same sub-pixel, an orthographic projection of the transparent pixel electrode on the base substrate covers the orthographic projection of the sub-bearing layer on the base substrate.

In some embodiments, the transparent display panel further includes: a first flat layer disposed between the plurality of reflecting structures and the liquid crystal layer, where the first flat layer covers the base substrate and the bearing layer, and fills the plurality of concave structures.

In some embodiments, the light guide substrate includes: a light guide plate disposed on a side, facing away from the base substrate, of the liquid crystal layer; a light extraction layer disposed between the light guide plate and the liquid crystal layer, where the light extraction layer includes a plurality of openings arranged at intervals, and an orthographic projection of one opening on the base substrate is located within one light entering region; a transparent common electrode layer disposed between the light extraction layer and the liquid crystal layer; a black matrix layer disposed between the transparent common electrode layer and the liquid crystal layer, where an orthographic projection of the black matrix layer on the base substrate overlaps with an orthographic projection of a gap between two light emitting regions on the base substrate, and an overlapping between the orthographic projection of the black matrix layer on the base substrate and an orthographic projection of the light entering region on the base substrate is 0; and a light source structure located on one side of the light guide plate.

An embodiment of the present disclosure provides a preparation method of the transparent display panel, including:

forming the bearing layer above the base substrate, where the bearing layer includes the plurality of concave structures, the base substrate includes the plurality of sub-pixels, and each sub-pixel includes a concave structure;

forming the plurality of reflecting structures on a side, facing away from the base substrate, of the bearing layer, where an orthographic projection of the concave structure on the base substrate covers an orthographic projection of the reflecting structure on the base substrate; and forming the liquid crystal layer between the base substrate and the light guide substrate, where the light guide substrate includes the plurality of light entering regions and the plurality of light emitting regions spaced from the plurality of light entering regions; and each sub-pixel includes a light entering region and a light emitting region;

bonding the base substrate with the light guide substrate;

where in a same sub-pixel, one or more reflecting structures reflect incident light to obtain emitted light, so that the emitted light is emitted by penetrating through the light emitting region of the light guide substrate; and the incident light is incident on the one or more reflecting structures, through the liquid crystal layer, from the light entering region of the light guide substrate.

In some embodiments, forming the bearing layer above the base substrate includes:

forming a bearing thin film layer above the base substrate by adopting photoresist with light shading performance;

exposing and developing the bearing thin film layer by adopting a first mask plate to form a plurality of sub-bearing layers disposed at intervals, where each sub-pixel includes one sub-bearing layer; and exposing each sub-bearing layer multiple times by adopting a second mask plate, with a different exposing light intensity for each time; and forming the concave structure on the each sub-bearing layer after developing.

In some embodiments, exposing multiple times by adopting a second mask plate, with a different exposing light intensity for each time includes:

disposing the second mask plate having a plurality of slits spaced apart from each other on a side, facing away from the base substrate, of the bearing layer, where each sub-bearing layer corresponds to one slit;

moving, using a set stepping, the second mask plate in a direction of a row of the plurality of sub-pixels; and exposing, according to a condition of sequentially increasing exposing light intensities, the each sub-bearing layer after each time of moving of the second mask plate is stopped; and developing the exposed base substrate, and forming the concave structure on each sub-bearing layer.

An embodiment of the present disclosure further provides a display device, including the transparent display panel.

DETAILED DESCRIPTION OF THE EMBODIMENTS

Figure 1:
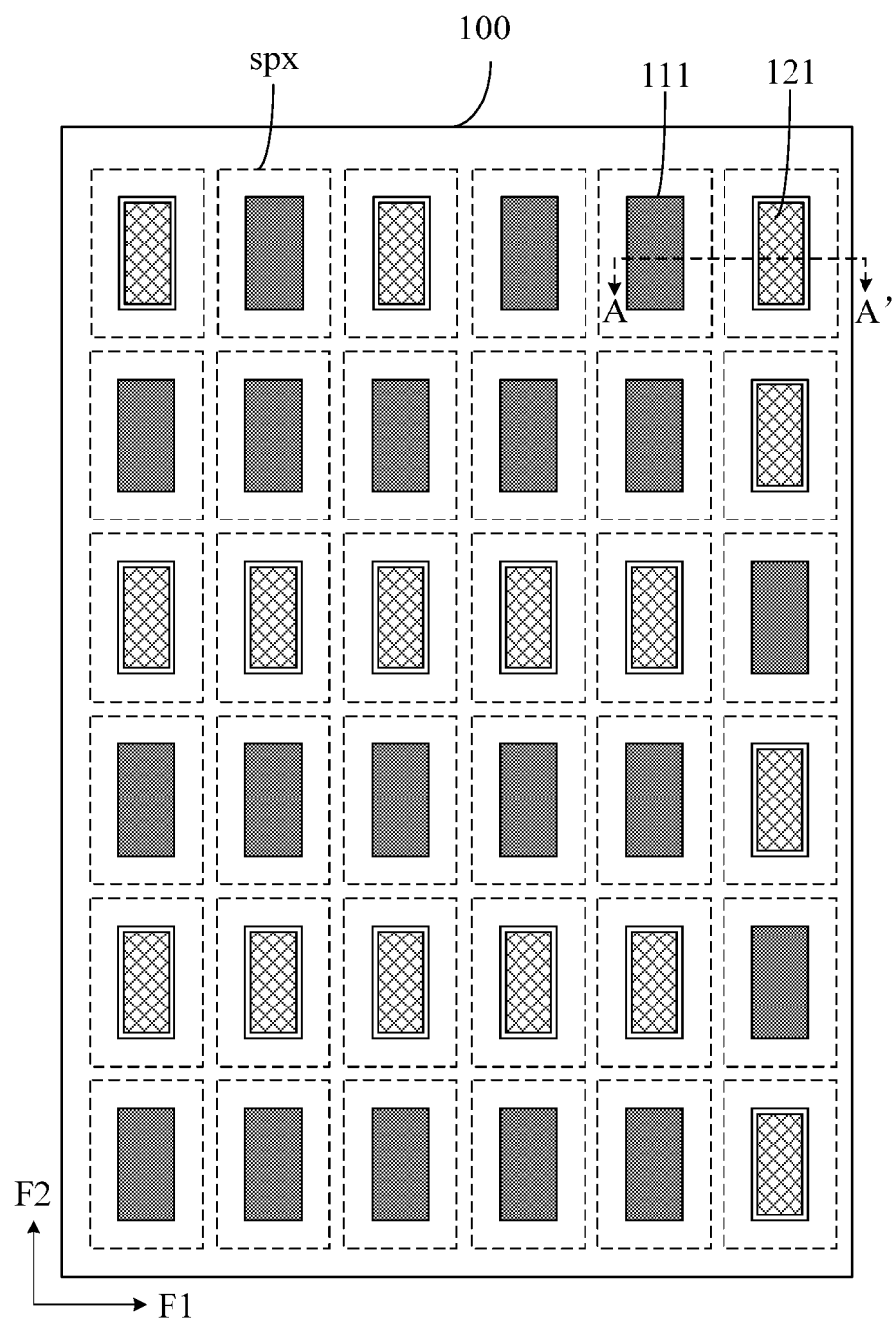
FIG. 1 is a schematic diagram of a top-view structure of a transparent display panel in an embodiment of the present disclosure.

In order to make the objectives, technical solutions and advantages of embodiments of the present disclosure clearer, the technical solutions of the embodiments of the present disclosure will be clearly and completely described below in conjunction with the accompanying drawings of the embodiments of the present disclosure. Apparently, the described embodiments are only a part of the embodiments of the present disclosure, not all of the embodiments. The embodiments in the present disclosure and features in the embodiments can be combined with each other in the case of no conflicting. Based on the described embodiments of the present disclosure, all other embodiments obtained by those of ordinary skill in the art without creative work shall fall within the protection scope of the present disclosure.

Unless otherwise defined, technical or scientific terms used in the present disclosure shall have the ordinary meanings understood by those ordinarily skilled in the art to which the present disclosure pertains. Words "first", "second" and the like used in the present disclosure do not indicate any order, quantity or importance, but are only configured to distinguish different components. Words "comprise" or "include" and the like indicate that an element or an item appearing before such the word covers listed elements or items appearing after the word and equivalents thereof, and does not exclude other elements or items. Words "connect" or "couple" and the like are not limited to physical or mechanical connection, but may include electrical connection, whether direct or indirect.

It needs to be noted that the sizes and shapes of all figures in the accompanying drawings do not reflect true scales, and are only intended to schematically illustrate the contents of the present disclosure. The same or similar reference numerals represent the same or similar elements or elements with the same or similar functions all the time.

Liquid crystal display (LCD) panels have the advantages of high color gamut, good picture quality, thinness, low power consumption, etc., and have been widely applied to electronic display products such as tablet computers, televisions, mobile phones and vehicle-mounted displays. However, in general conditions, a liquid crystal display panel generally includes a liquid crystal display substrate and a backlight source, and due to the existence of the backlight source, the liquid crystal display panel has large obstruction when applied to transparent display.

Figure 2A:
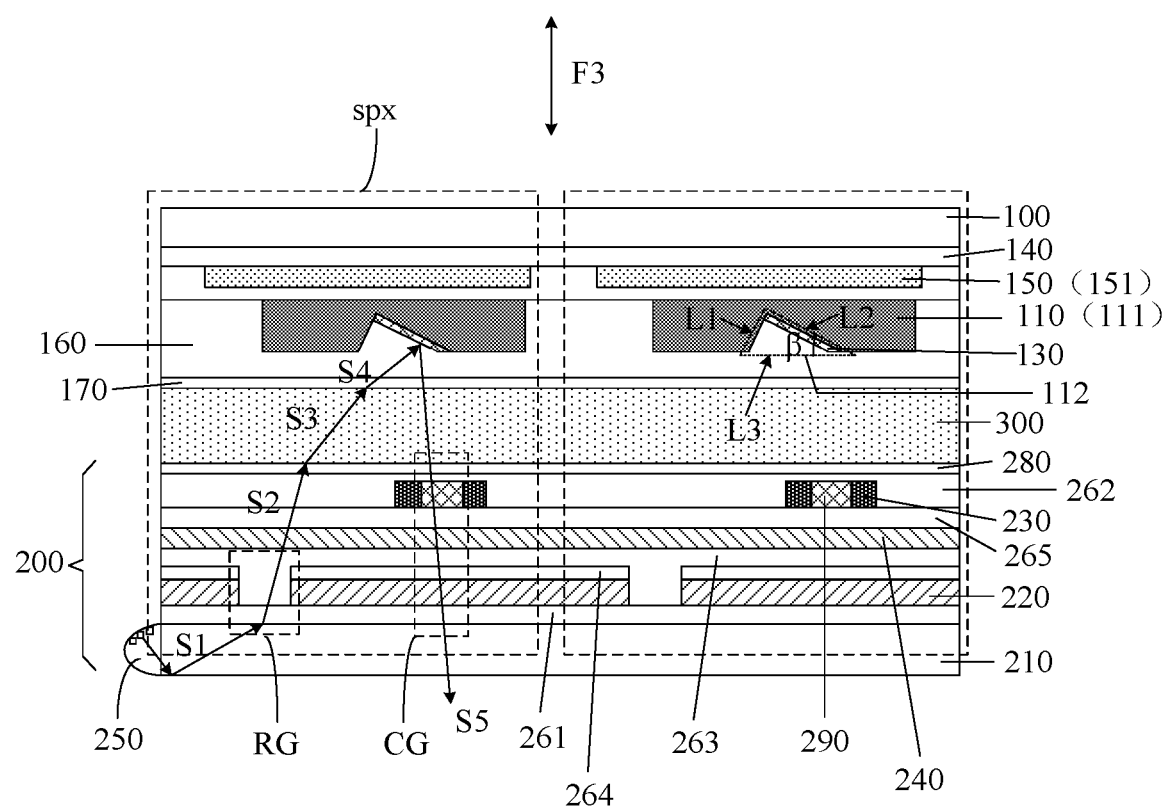
FIG. 2A is a schematic diagram of some sectional structures of the transparent display panel shown in FIG. 1 in a direction AA'.
Figure 2B:
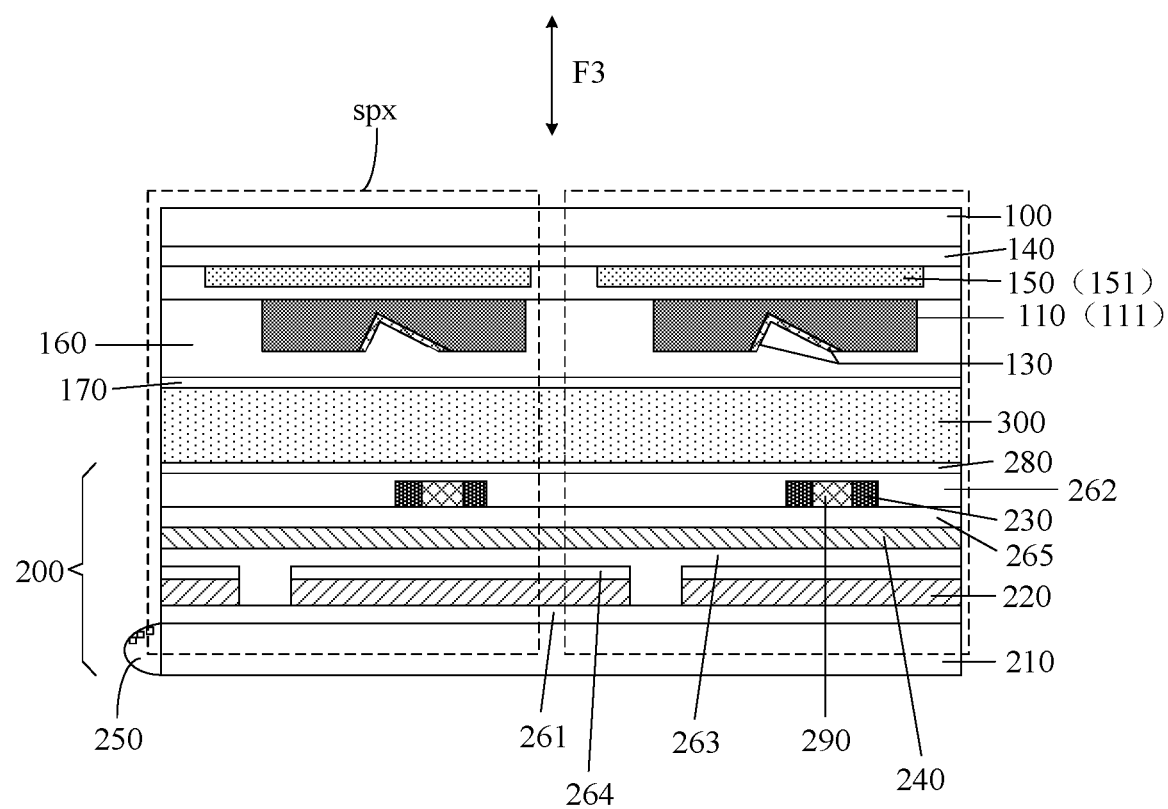
FIG. 2B is a schematic diagram of other sectional structures of the transparent display panel shown in FIG. 1 in the direction AA'.

To this end, an embodiment of the present disclosure provides a transparent display panel, and as shown in FIG. 1 to FIG. 2B, the transparent display panel may include:

a base substrate 100, including a plurality of sub-pixels spx;

a light guide substrate 200, arranged opposite to the base substrate 100, and including a plurality of light entering regions RG and a plurality of light emitting regions CG spaced from the plurality of light entering regions RG, where one sub-pixel spx includes one light entering region RG and one light emitting region CG;

a liquid crystal layer 300, disposed between the base substrate 100 and the light guide substrate 200;

a bearing layer 110, disposed between the base substrate 100 and the liquid crystal layer 300, and including a plurality of concave structures 112, where one sub-pixel spx includes one concave structure 112; and a plurality of reflecting structures 130, located between the bearing layer 110 and the liquid crystal layer 300, where an orthographic projection of the concave structure 112 on the base substrate 100 covers an orthographic projection of one or more reflecting structures 130 on the base substrate 100;

in the same sub-pixel spx, the one or more reflecting structures 130 are configured to, when incident light of the light entering region RG of the light guide substrate 200 enters the one or more reflecting structures 130 through the liquid crystal layer 300, reflect the incident light to obtain emitted light, and make the emitted light be emitted by penetrating through the light emitting region CG of the light guide substrate 200. In one embodiment, referring to FIG. 2A, a refracting index of the liquid crystal layer 300 may be controlled by controlling a deflection state of liquid crystal molecules in the liquid crystal layer 300 in the sub-pixels spx, then light S1 incident to the light guide substrate 200 may be refracted by the light entering region RG to form light S2, the light S2 enters the liquid crystal layer 300 to form light S3, the light S3 shoots out of the liquid crystals to form light S4, the light S4 is incident to the reflecting structure 130, the light S4 is reflected via a reflecting action of the reflecting structure 130 to obtain reflected light S5, and the reflected light S5 passes through the liquid crystal layer 300, the light emitting region CG and the light guide substrate 200 and then is emitted. Therefore, an image display effect can be achieved. It may be understood that a light path in FIG. 2A is only schematic.

According to the transparent display panel provided by the embodiment of the present disclosure, the bearing layer with the concave structures is disposed, the plurality of reflecting structures are arranged on a side, facing the liquid crystal layer, of the bearing layer, and thus light entering the reflecting structures from the light guide substrate is reflected and then emitted from the light emitting regions. Therefore, the liquid crystal display panel may achieve a transparent display effect.

Figure 3:
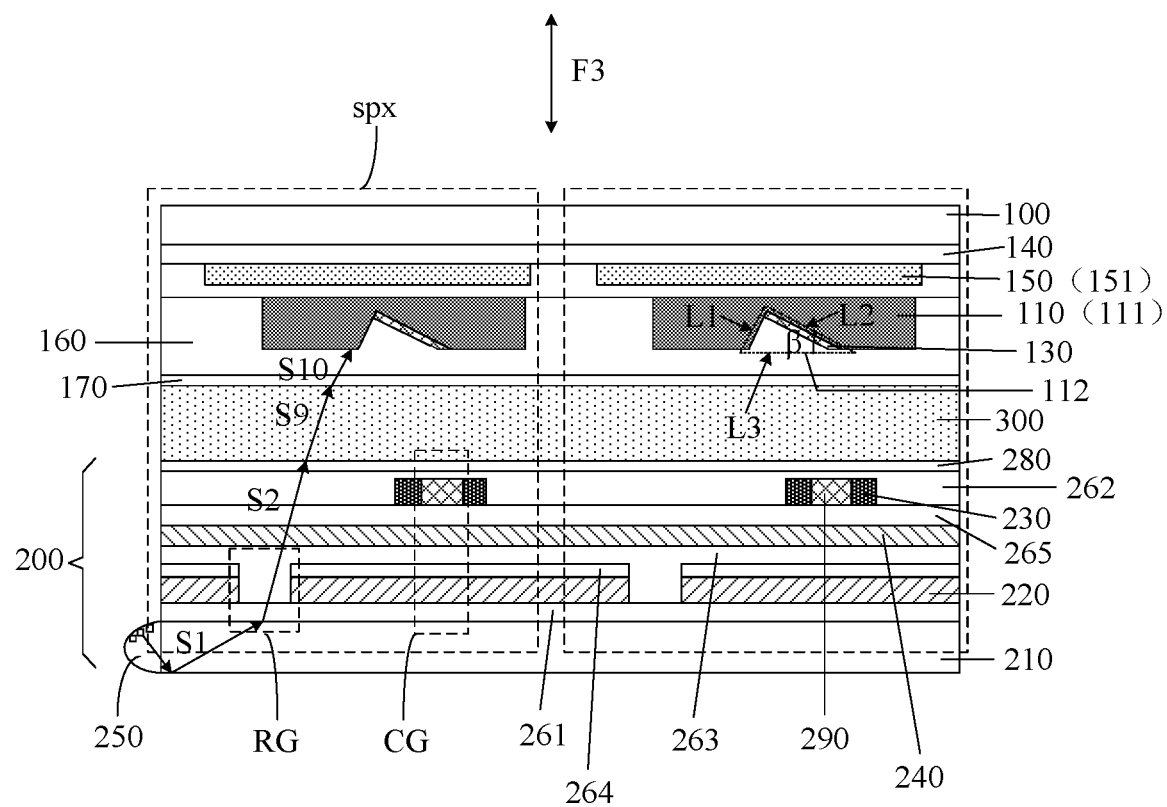
FIG. 3 is a schematic diagram of yet other sectional structures of the transparent display panel shown in FIG. 1 in the direction AA'.

In some embodiments, the bearing layer 110 has a light shading effect. In this way, referring to FIG. 3, the refracting index of the liquid crystal layer 300 may be changed by controlling a deflection state of liquid crystal molecules in the liquid crystal layer 300 in the sub-pixels spx, then light S1 incident to the light guide substrate 200 may be refracted by the light entering region RG to form light S2, the light S2 enters the liquid crystal layer 300 to form light S9, the light S9 shoots out of the liquid crystals to form light S10, the light S10 is incident to the bearing layer 110, and through the light shading action of the bearing layer 110, the light S5 being emitted from the light emitting region CG as shown in FIG. 2A can be avoided, and thus a black picture can be formed. It may be understood that a light path in FIG. 3 is only schematic.

Under an implementation in the embodiment of the present disclosure, as shown in FIG. 1 to FIG. 2B, a cross section of the concave structure 112 in a row direction F1 parallel to the sub-pixels spx and a direction F3 perpendicular to the base substrate 100 is a triangle. In some embodiments, the triangle has a first edge L1, a second edge L2 and a third edge L3 connected in sequence. The first edge L1 and the second edge L2 are located at side edges of the concave structure 112, and the third edge L3 is located at an opening of the concave structure 112. A length of the second edge L2 is greater than a length of the first edge L1, and an included angle β between the second edge L2 and the third edge L3 ranges from 20° to 40°. For example, the included angle β may range from 25° to 35°. For example, the included angle β may range from 28° to 32°. For example, the included angle β may be 20°. The included angle β may also be 25°. The included angle β may also be 28°. The included angle β may also be 30°. The included angle β may also be 32°. The included angle β may also be 35°. The included angle β may also be 40°. It needs to be noted that a reflecting angle of the light S4 may be adjusted by adjusting the included angle β to make the light S4 be emitted from the light emitting region CG. Of course, in practical application, a specific value of the included angle β may be designed and determined according to the requirements of the practical application, which is not limited here.

Under an implementation in the embodiment of the present disclosure, as shown in FIG. 1 and FIG. 2A, the reflecting structures 130 may be disposed only on the second edges L2 of the concave structures 112. In this way, a setting area of the reflecting structures can be lowered, and no reflecting structure is arranged in a position of the concave structures 112 not playing a reflecting function, so that generation of stray light is reduced. In this case, in one sub-pixel, an orthographic projection of the concave structure 112 on the base substrate covers an orthographic projection of one reflecting structure 112 on the base substrate. Or, as shown in FIG. 2B, the reflecting structures 130 may be arranged both on the first edges L1 and the second edges L2 of the concave structures 112. In this way, the process preparation difficulty can be lowered. In this case, in one sub-pixel, an orthographic projection of the concave structure 112 on the base substrate covers an orthographic projection of two reflecting structures 112 on the base substrate.

Under an implementation in the embodiment of the present disclosure, as shown in FIG. 1 to FIG. 2B, the sub-pixels spx are distributed in an array. For example, the sub-pixels spx are evenly arrayed in the row direction F1 and a column direction F2. Further, the transparent display panel may include: a plurality of pixel units distributed in an array. Each pixel unit includes a plurality of sub-pixels spx. In some embodiments, one pixel unit may include red sub-pixels, green sub-pixels and blue sub-pixels, and therefore red, green and blue may be mixed to achieve color display. Or, one pixel unit may also include red sub-pixels, green sub-pixels, blue sub-pixels and white sub-pixels, and therefore red, green, blue and white may be mixed to achieve color display. Of course, in practical application, a light emitting color of the sub-pixels in the pixel units may be designed and determined according to practical application environments, which is not limited here. In some embodiments, each sub-pixel constitutes a pixel, namely each sub-pixel displays the same color, and such design may achieve single-color display and increase the resolution of the display panel.

Under an implementation in the embodiment of the present disclosure, as shown in FIG. 1 to FIG. 2B, the bearing layer 110 may include a plurality of sub-bearing layers 111 disposed at intervals 111. Each sub-pixel spx includes one sub-bearing layer 111, and an orthographic projection of the sub-bearing layer 111 on the base substrate 100 covers an orthographic projection of the concave structure 112 on the base substrate 100. In this way, by disposing the sub-bearing layers 111, not only can light entering from one side of the base substrate 100 to the reflecting structures 130 be shielded, but also the transparent display effect can be achieved via gaps between the sub-bearing layers 111.

Under an implementation in the embodiment of the present disclosure, in order to make the bearing layer 110 achieve the light shading effect, a material of the bearing layer 110 may be a material with light shading performance. For example, the material of the bearing layer 110 may be a photoresist with the light shading performance. For example, the material of the bearing layer 110 may be a black photoresist. Of course, in practical application, the material of the bearing layer 110 may be designed and determined according to the requirements of the practical application, which is not limited here.

Under an implementation in the embodiment of the present disclosure, as shown in FIG. 1 to FIG. 2B, the transparent display panel may further include: a transistor layer 140 located between the base substrate 100 and the bearing layer 110, and a driving electrode layer 150 located between the transistor layer 140 and the bearing layer 110. The transistor layer 140 includes a plurality of thin film transistors (not shown). The driving electrode layer 150 includes a plurality of transparent pixel electrodes 151. One sub-pixel spx includes one thin film transistor and one transparent pixel electrode 151, and the thin film transistor and the transparent pixel electrode 151 in the same sub-pixel spx are electrically connected to each other. It needs to be noted that the thin film transistor includes a gate electrode, an active layer, a source electrode and a drain electrode. For example, the transistor layer 140 may further include a plurality of gate lines and data lines, the gate electrodes of the thin film transistors of one row of sub-pixels spx are electrically connected with one gate line, the source electrodes of the thin film transistors of one column of sub-pixels spx are electrically connected with one data line, and the drain electrodes of the thin film transistors in each sub-pixel spx are electrically connected with the transparent pixel electrode 151.

In some embodiments, a material of the transparent pixel electrode 151 may be a transparent conducting material, e.g., an indium tin oxide (ITO) material, an indium zinc oxide (IZO) material, carbon nanotubes or graphene, etc., which is not limited here.

In some embodiments, as shown in FIG. 1 to FIG. 2B, in the same sub-pixel spx, an orthographic projection of the sub-bearing layer 111 on the base substrate 100 covers an orthographic projection of the thin film transistor on the base substrate 100. In this way, the impact of the thin film transistors on the poor viewing of objects through transparent display panel can be reduced.

In some embodiments, as shown in FIG. 1 to FIG. 2B, in the same sub-pixel spx, an orthographic projection of the transparent pixel electrode 151 on the base substrate 100 covers an orthographic projection of the sub-bearing layer 111 on the base substrate 100. In some embodiments, in the same sub-pixel spx, the orthographic projection of the transparent pixel electrode 151 on the base substrate 100 covers the light entering region RG. Therefore, the liquid crystal molecules can be controlled to deflect to the maximum extent.

In order to avoid the impact of the concave structures 112 on arrangement of the liquid crystal molecules, in some embodiments of the present disclosure, as shown in FIG. 1 to FIG. 2B, the display panel may further include: a first flat layer 160 disposed between the plurality of reflecting structures 130 and the liquid crystal layer 300. The first flat layer 160 covers the base substrate 100 and the bearing layer 110 and fills the concave structures 112. The display panel may further include: a first alignment layer 170 located between the first flat layer 160 and the liquid crystal layer 300. The first alignment layer 170 covers the base substrate 100. In this way, a flat effect can be achieved through the first flat layer 160, so that when the first alignment layer 170 is formed, the adverse influence of the concave structures 112 on the first alignment layer 170 during friction of the first alignment layer 170 can be lowered. Due to the existence of the concave structures, if the first flat layer 160 is not disposed, liquid crystal disorder will be caused, resulting in light leakage, and by disposing the first flat layer 160 and performing whole-face covering, planarization can be achieved.

Under an implementation in the embodiment of the present disclosure, as shown in FIG. 1 to FIG. 2B, the light guide substrate 200 includes: a light guide plate 210 disposed on a side, facing away from the base substrate 100, of the liquid crystal layer 300, a light extraction layer 220 disposed between the light guide plate 210 and the liquid crystal layer 300, a transparent common electrode layer 240 disposed between the light extraction layer 220 and the liquid crystal layer 300, a black matrix layer 230 disposed between the transparent common electrode layer 240 and the liquid crystal layer 300, and a light source structure 250 located on one side of the light guide plate 210. The light extraction layer 220 includes a plurality of openings disposed at intervals. An orthographic projection of one opening on the base substrate 100 is located within an orthographic projection of one light entering region RG on the base substrate 100. An orthographic projection of the black matrix layer 230 on the base substrate 100 overlaps with an orthographic projection of a gap between two light emitting regions CG on the base substrate 100, and does not overlap with an orthographic projection of the light entering region RG on the base substrate 100.

Under an implementation in the embodiment of the present disclosure, as shown in FIG. 1 to FIG. 2B, the transparent display panel may further include a color film layer 290. In some embodiments, an orthographic projection of the color film layer 290 on the light guide plate 210 overlaps with an orthographic projection of the light emitting region CG on the light guide plate 210. In some embodiments, the orthographic projection of the color film layer 290 on the light guide plate 210 completely overlaps with the orthographic projection of the light emitting region CG on the light guide plate. In some embodiments, the color film layer 290 in the red sub-pixel may be a red color film layer. The color film layer 290 in the green sub-pixel may be a green color film layer. The color film layer 290 in the blue sub-pixel may be a blue color film layer. In some embodiments, the color film layer 290 may be a colorless transparent film layer, such as transparent resin, etc.

In some embodiments of the present disclosure, as shown in FIG. 2A and FIG. 2B, an etch barrier layer (not shown) may be further disposed between the light extraction layer 220 and the light guide plate 210. In some embodiments, a material of the etch barrier layer may be an indium gallium zinc oxide (IGZO). In this way, during later etching, the situation that a surface of the light guide plate 210 is etched to become coarse, resulting in diffuse reflection can be prevented.

In some embodiments of the present disclosure, as shown in FIG. 2A and FIG. 2B, an auxiliary layer 264 is further disposed between the light extraction layer 220 and the transparent common electrode layer 240. Moreover, an orthographic projection of the auxiliary layer 264 on the light guide plate 210 overlaps with an orthographic projection of the light extraction layer 220 on the light guide plate 210. Further, the orthographic projection of the auxiliary layer 264 on the light guide plate 210 completely overlaps with the orthographic projection of the light extraction layer 220 on the light guide plate 210. The auxiliary layer 264 can prevent damage of etching and peeling technologies on the upper surface of the light extraction layer 220. In some embodiments, a material of the auxiliary layer 264 may include $SiO_2$. Of course, the auxiliary layer 264 may also be prepared from other materials, which may be designed and determined according to the requirements of practical application, which is not limited here.

In some embodiments of the present disclosure, as shown in FIG. 2A and FIG. 2B, a third flat layer 263 is further disposed between the auxiliary layer 264 and the transparent common electrode layer 240. Moreover, the third flat layer 263 covers the light guide plate 210, the light extraction layer 220 and the auxiliary layer 264 and fills the openings of the light extraction layer 220. In this way, the flat effect can be achieved via the third flat layer 263. Therefore, when the transparent common electrode layer 240 is formed, the adverse influence of the openings of the light extraction layer 220 on realization of surface planarization of the transparent common electrode layer 240 is lowered to better control electric field distribution to achieve an expected light emitting effect.

In some embodiments of the present disclosure, as shown in FIG. 2A and FIG. 2B, a dielectric layer 265 is further disposed between the transparent common electrode layer 240 and the black matrix layer 230. Moreover, the dielectric layer 265 covers the transparent common electrode layer 240. The dielectric layer 265 may increase adhesion of the black matrix layer 230, and insulate the black matrix layer 230 from the transparent common electrode layer 240 to prevent interference of the black matrix layer 230 with sensing of liquid crystals to an electric field. In some embodiments, a material of the dielectric layer 265 may include $SiO_2$. Of course, the dielectric layer 265 may also be prepared from other materials, which may be designed and determined according to the requirements of practical application, which is not limited here.

In some embodiments of the present disclosure, as shown in FIG. 2A and FIG. 2B, a second flat layer 262 is further disposed between the black matrix layer 230 and the liquid crystal layer 300, and in this way, liquid crystal disorder caused by segment difference can be prevented, and light leakage or other display abnormality is avoided.

Figure 5A:
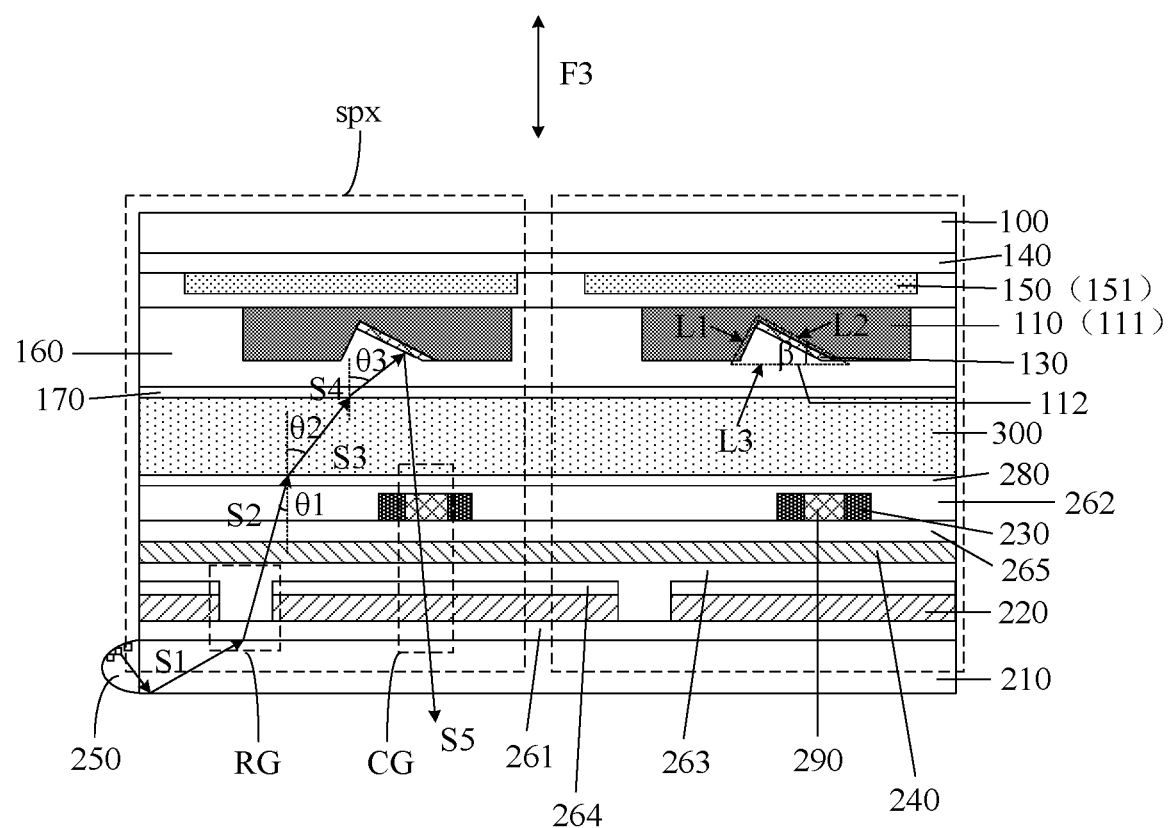
FIG. 5A is a schematic diagram of yet other sectional structures of the transparent display panel shown in FIG. 1 in the direction AA'.

It needs to be noted that different data voltages may be input to the transparent pixel electrodes 151 through conduction and stop of the thin film transistors, so that electric field between the transparent pixel electrodes 151 and the transparent common electrode layer 240 may be different, and thus the deflection degree of the liquid crystal may be controlled differently to achieve light emitting as well as to achieve brightness of different gray scales. Further, the first flat layer 160 and the second flat layer 262 may be disposed to control the light emitting direction to be consistent when different gray scales are adopted for display. In combination with FIG. 5A, θ1 is a refraction angle of the light S2, θ2 is a refraction angle of the light S3, θ3 is a refraction angle of the light S4, n1 is a refracting index of a dielectric environment where light is located before entering the liquid crystal layer 300, n2 is a refracting index of the liquid crystal layer 300, and n3 is a refracting index of the first flat layer 160. In order to meet the following formula: $n1*\sin(\theta 1)=n2*\sin(\theta 2)=n3*\sin(\theta 3)$, where n1 and θ1 are fixed, since the liquid crystal layer may be equivalent to parallel plates of multiple layers of dielectrics, n2 is not a fixed value, n3 and θ3 are fixed, a final light emitting angle may be a fixed value, and thus the light emitting direction may be made consistent.

Under an implementation in the embodiment of the present disclosure, refracting index of the light extraction layer 220 may be smaller than that of the light guide plate 210. In some implementations, the refracting index of the light extraction layer 220 may range from 1.20 to 1.30. The refracting index of the light guide plate 210 may range from 1.50 to 1.60. For example, the refracting index of the light extraction layer 220 may be 1.20, and the refracting index of the light guide plate 210 may be 1.50. Or, the refracting index of the light extraction layer 220 may be 1.25, and the refracting index of the light guide plate 210 may be 1.56. Or, the refracting index of the light extraction layer 220 may be 1.30, and the refracting index of the light guide plate 210 may be 1.60. In practical application, the refracting indexes of the light extraction layer 220 and the light guide plate 210 may be designed and determined according to the requirements of the practical application, which is not limited here.

Under an implementation in the embodiment of the present disclosure, refracting index of the second flat layer 262 may be equal to or approximately equal to that of the light guide plate 210, so that light entering the light guide plate 210 can effectively enter the light entering regions RG. For example, when the refracting index of the light guide plate 210 is 1.50, the refracting index of the second flat layer 262 may be 1.50, or 1.52 or 1.55, and the refracting index of the second flat layer 262 may also vary within the range of 1.52±0.05 along with the change of light wave lengths.

Under an implementation in the embodiment of the present disclosure, as shown in FIG. 1 to FIG. 2B, the light guide substrate 200 may further include: a second alignment layer 280 located between the transparent common electrode layer 240 and the liquid crystal layer 300. Moreover, the light source structure 250 may emit polarized light to the light guide plate 210. In some embodiments, the light source structure 250 may be an LED light source.

Under an implementation in the embodiment of the present disclosure, a material of the transparent common electrode layer 240 may be a transparent conducting material, e.g., an indium tin oxide (ITO) material, an indium zinc oxide (IZO) material, carbon nanotubes or graphene, etc., which is not limited here.

Under an implementation in the embodiment of the present disclosure, a supporting part (not shown) may be further provided between the first alignment layer 170 and the second alignment layer 280, and in this way, a space for packaging the liquid crystal layer 300 may be supported through the supporting part. Further, the orthographic projection of the sub-bearing layers 111 on the base substrate 100 may cover an orthographic projection of the supporting part on the base substrate 100.

Figure 4:
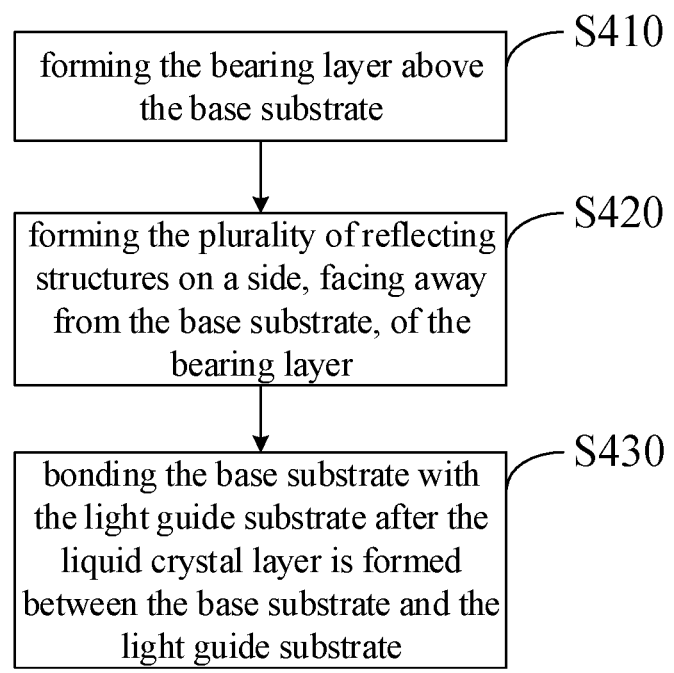
FIG. 4 is a flowchart of a preparation method of a transparent display panel in an embodiment of the present disclosure.

An embodiment of the present disclosure provides a preparation method of the transparent display panel, and as shown in FIG. 4, the method may include the following steps:

S410, forming the bearing layer 110 above the base substrate 100;

S420, forming the plurality of reflecting structures 130 on a side, facing away from the base substrate 100, of the bearing layer 110; and S430, bonding the base substrate 100 with the light guide substrate 200 after the liquid crystal layer 300 is formed between the base substrate 100 and the light guide substrate 200;

where the base substrate 100 includes the plurality of sub-pixels spx; the light guide substrate 200 includes the plurality of light entering regions RG and the plurality of light emitting regions CG spaced from the plurality of light entering regions RG; the bearing layer 110 includes the plurality of concave structures 112; each sub-pixel spx includes one light entering region RG, one light emitting region CG and one concave structure 112, and an orthographic projection of the concave structure 112 on the base substrate 100 covers an orthographic projection of the reflecting structure 130 on the base substrate 100. In the same sub-pixel spx, one or more reflecting structures 130 are configured to, when incident light of the light entering region RG of the light guide substrate 200 enters the one or more reflecting structures 130 through the liquid crystal layer 300, reflect the incident light to obtain emitted light, and make the emitted light be emitted by penetrating through the light emitting region CG of the light guide substrate 200.

Under an implementation in the embodiment of the present disclosure, forming the bearing layer 110 above the base substrate 100, may include:

forming a bearing thin film layer above the base substrate 100 by adopting a photoresist with light shading performance;

exposing and developing the bearing thin film layer by adopting a first mask plate to form a plurality of sub-bearing layers 111 disposed at intervals, where each-pixel spx includes one sub-bearing layer 111; and exposing each sub-bearing layer 111 multiple times by adopting a second mask plate, with a different exposing light intensity for each time, and forming the concave structure 112 on the each sub-bearing layer 111 after developing.

Figure 6:
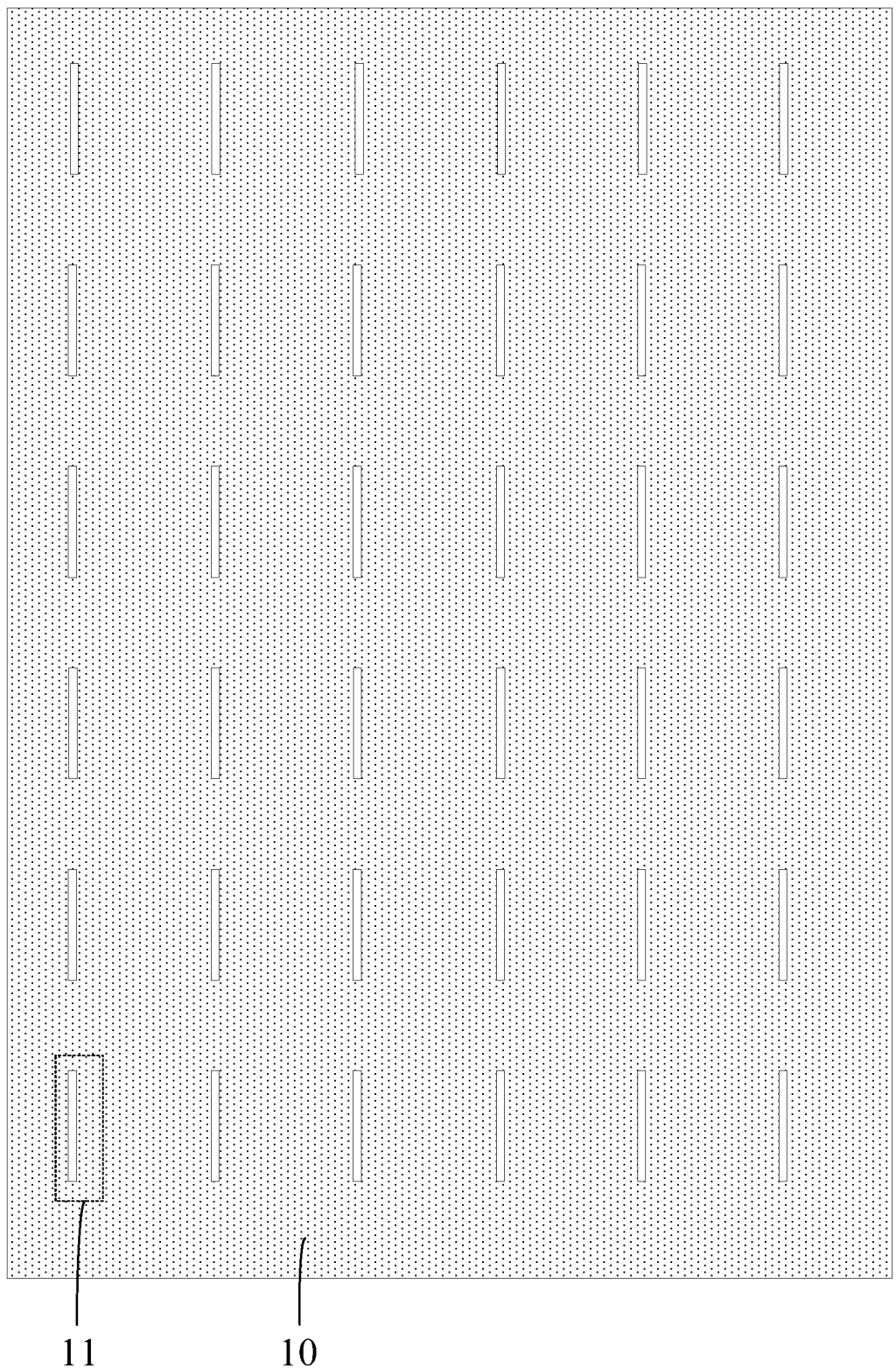
FIG. 6 is a schematic diagram of some top-view structures of a second mask plate in an embodiment of the present disclosure.

In some embodiments, exposing each sub-bearing layer 111 multiple times by adopting the second mask plate, with a different light intensity for each time, includes:

disposing the second mask plate 10 having a plurality of slits 11 spaced apart from each other on a side, facing away from the base substrate 100, of the bearing layer 110, where one sub-bearing layer 111 corresponds to one slit 11, as shown in FIG. 6;

moving, using a set stepping, the second mask plate in a direction of a row of the plurality of sub-pixels spx, and exposing, according to a condition of sequentially increasing exposing light intensities, the each sub-bearing layer after each time of moving of the second mask plate is stopped; and developing the exposed base substrate 100, and forming the concave structure 112 on each sub-bearing layer 111.

In some embodiments, the set stepping may range from 1 to 3 microns for moving the second mask plate each time. For example, the set stepping may be 1 micron for moving the second mask plate each time. The set stepping may also be 2 microns for moving the second mask plate each time. The set stepping may also be 3 microns for moving the second mask plate each time. Of course, the set stepping may be designed and determined according to the requirements of practical application, which is not limited here.

The preparation method provided by the embodiment of the present disclosure is illustrated through some embodiments below in combination with FIG. 2A. The preparation method provided by the embodiment of the present disclosure may include the following steps.

(1) A transistor layer 140 is formed on the base substrate 100 (e.g., a glass substrate). Thin film transistors in the transistor layer 140 in the present disclosure may be metal oxide semiconductor (MOS) transistors. In practical application, the thin film transistors in the embodiment of the present disclosure may be formed through a technology of forming the MOS transistors, and the specific process is not repeated here.

(2) A plurality of transparent pixel electrodes 151 are formed on a side, facing away from the base substrate 100, of the transistor layer 140 with the ITO material through a composition process. In some embodiments, a thickness of the transparent pixel electrode layer 140 may range from 10 to 80 nm. For example, the thickness of the transparent pixel electrode layer may be 10 nm, 40 nm, 70 nm and 80 nm. Preferably, the thickness of the transparent pixel electrode layer may be 70 nm.

(3) The bearing thin film layer covering the base substrate 100 is formed above the base substrate 100 by adopting the photoresist with the light shading performance. In some embodiments, a thickness of the bearing thin film layer in a direction perpendicular to the base substrate 100 may range from 4 to 8 microns. For example, the thickness of the bearing thin film layer in the direction perpendicular to the base substrate 100 may be 4 microns, 6 microns and 8 microns. Preferably, the thickness of the bearing thin film layer in the direction perpendicular to the base substrate 100 may be 6 microns.

(4) The bearing thin film layer is exposed and developed by adopting the first mask plate to form the plurality of sub-bearing layers 111 disposed at intervals. In some embodiments, a thickness of the sub-bearing layer 111 may be 6 microns.

(5) The second mask plate having the plurality of slits spaced from each other is disposed on the side, facing away from the base substrate 100, of the bearing layer 110. A width of the slit may be 2 microns.

Figure 7A:
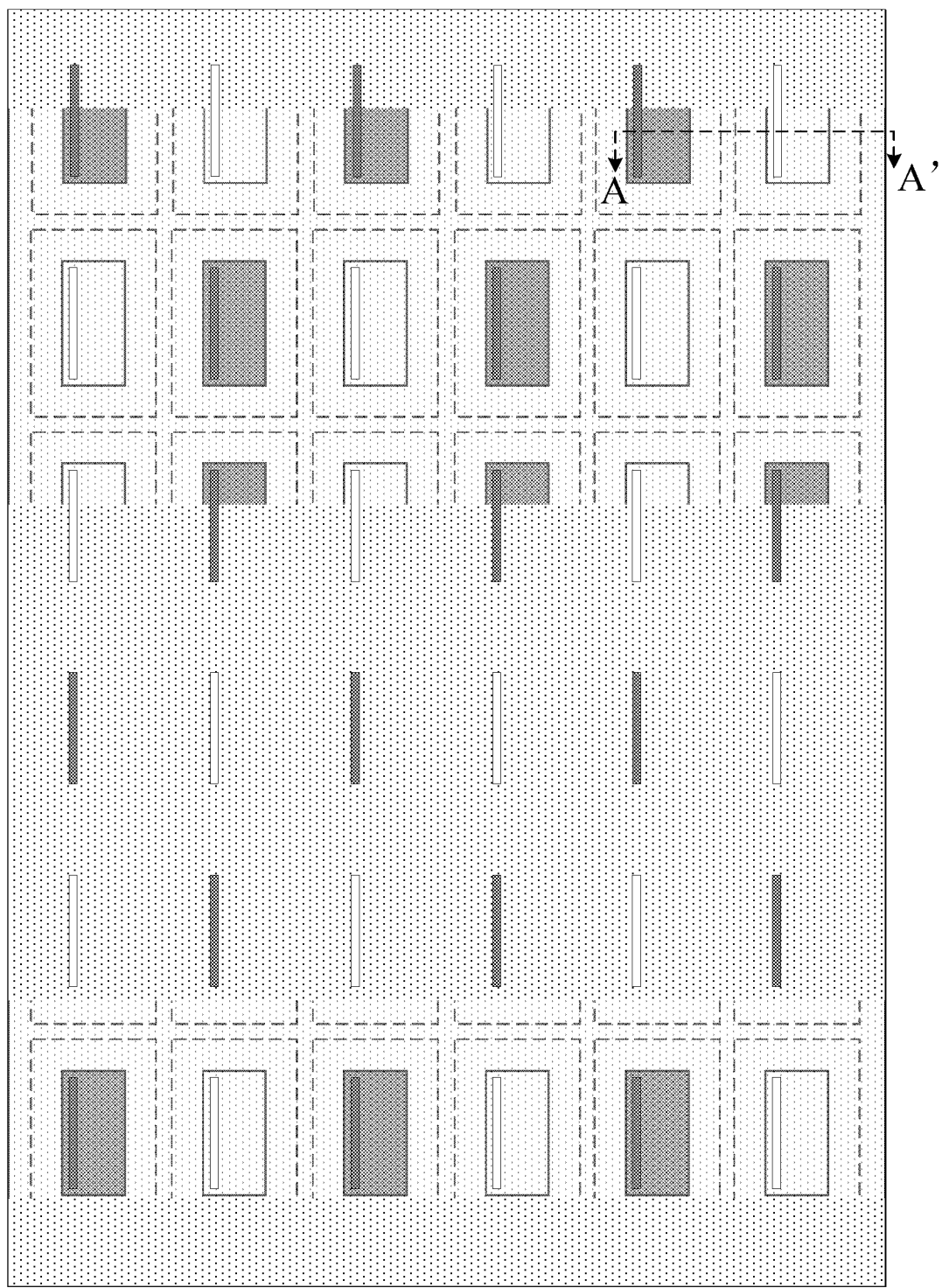
FIG. 7A is a schematic diagram of some top-view structures of a second mask plate and a base substrate in an embodiment of the present disclosure.
Figure 7B:
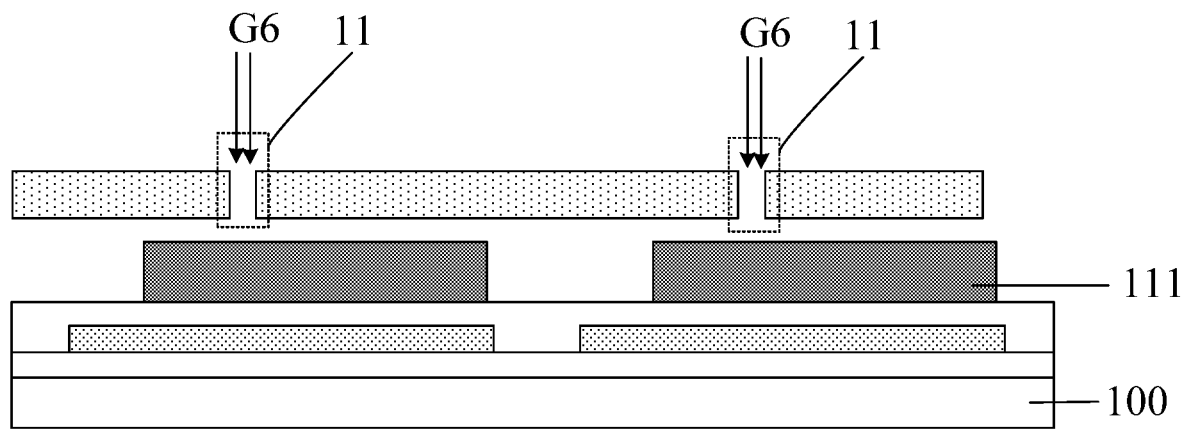
FIG. 7B is a schematic diagram of a sectional structure of the second mask plate and the base substrate shown in FIG. 7A in a direction AA'.
Figure 8A:
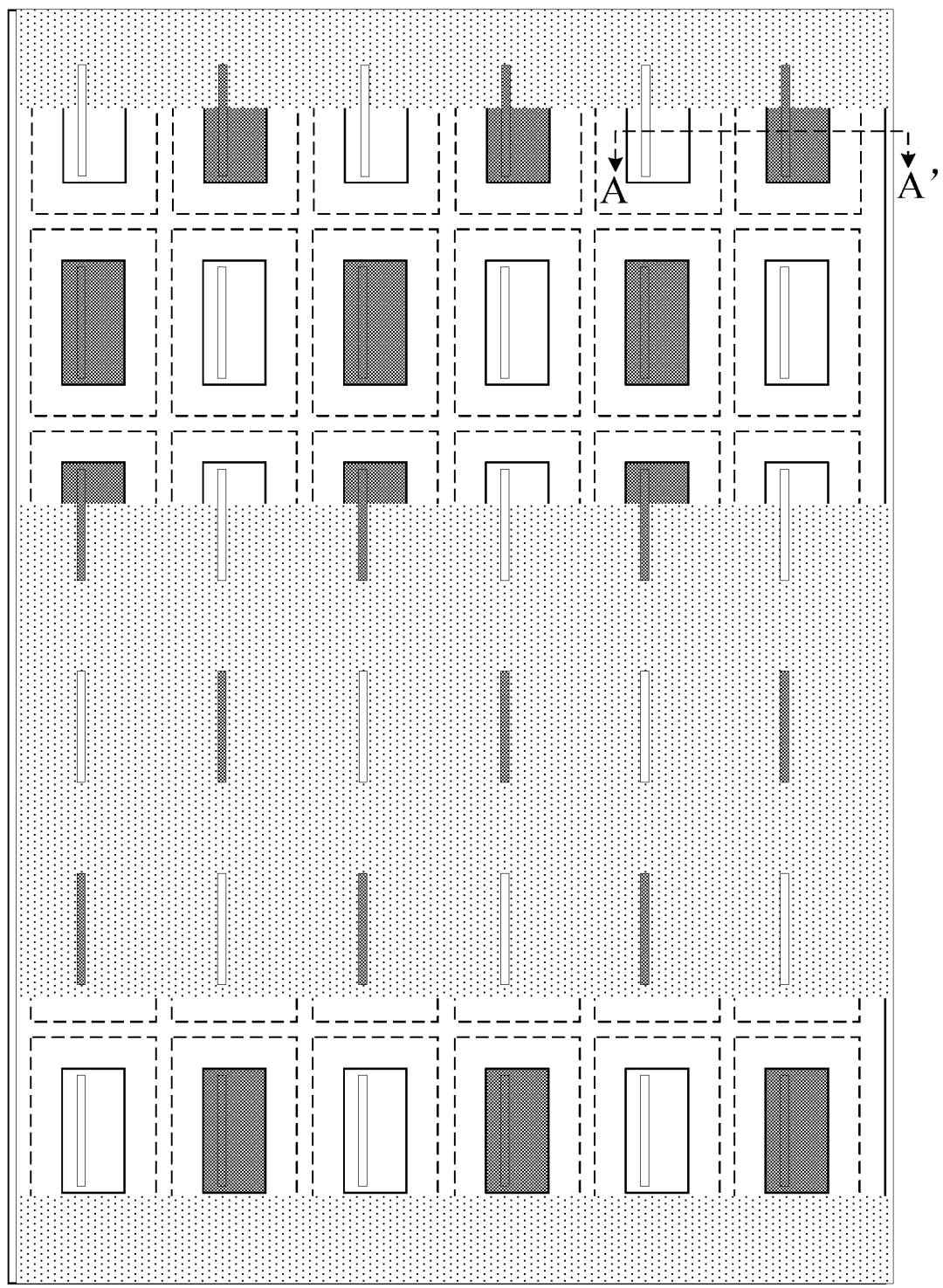
FIG. 8A is a schematic diagram of other top-view structures of a second mask plate and a base substrate in an embodiment of the present disclosure.
Figure 8B:
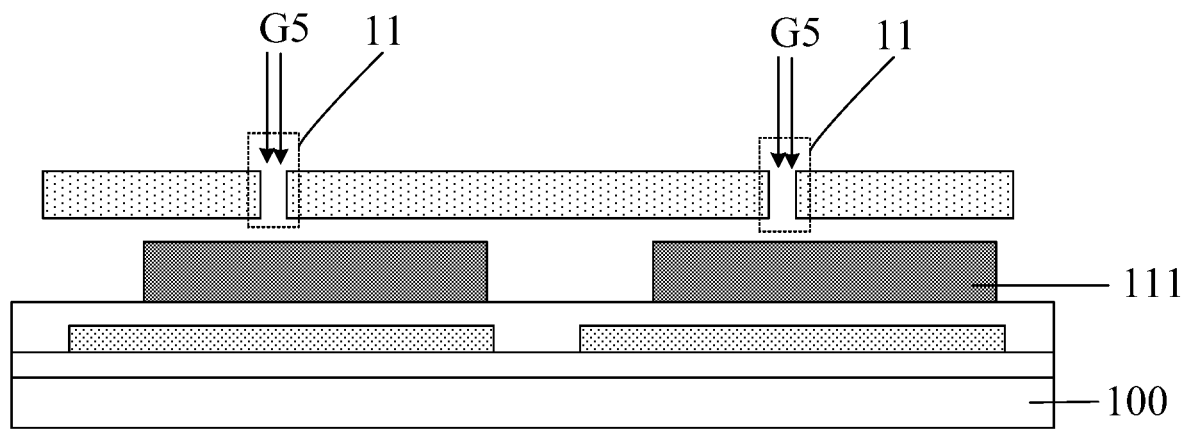
FIG. 8B is a schematic diagram of a sectional structure of the second mask plate and the base substrate shown in FIG. 8A in a direction AA'.
Figure 9A:
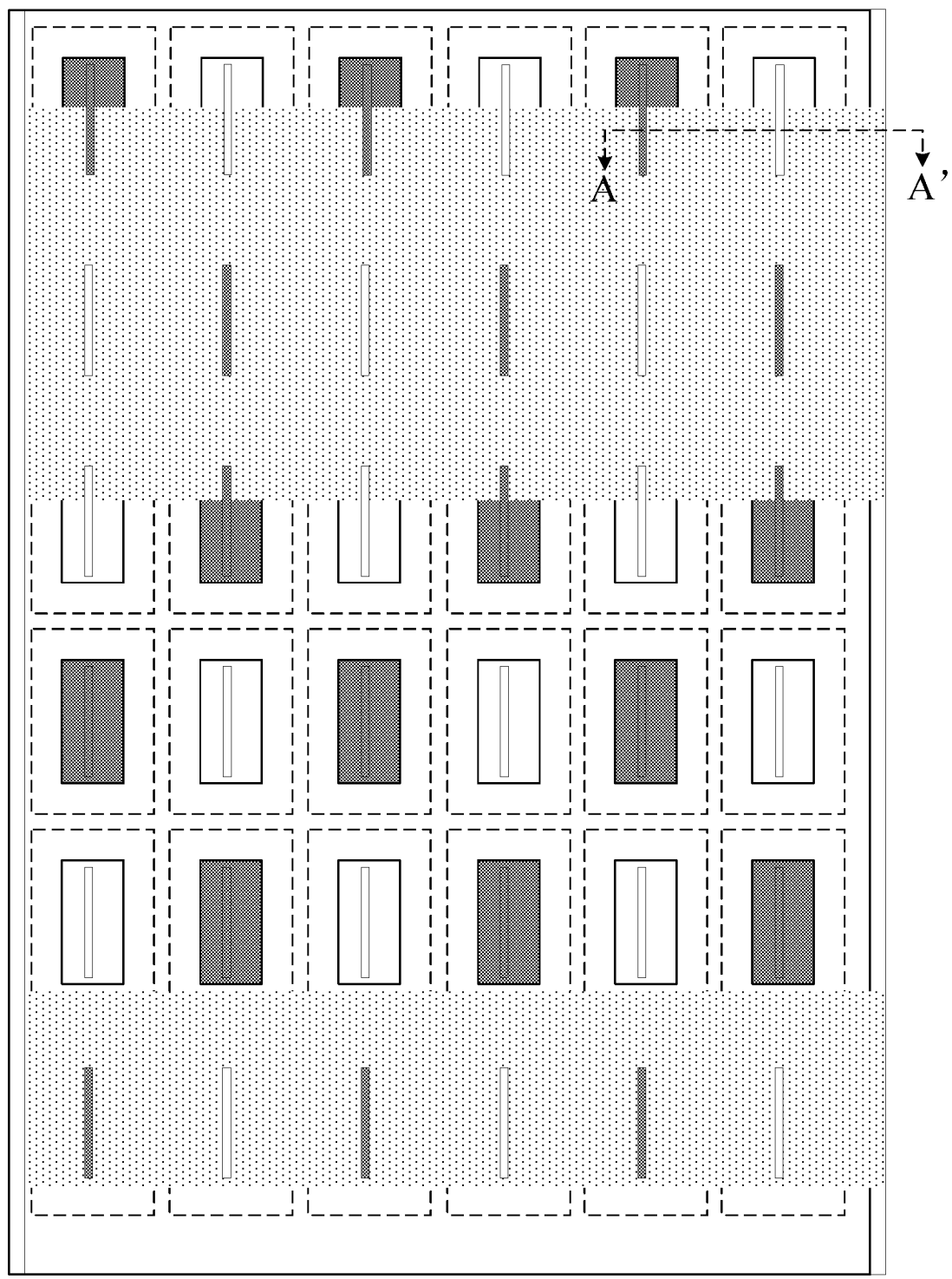
FIG. 9A is a schematic diagram of yet other top-view structures of a second mask plate and a base substrate in an embodiment of the present disclosure.
Figure 9B:
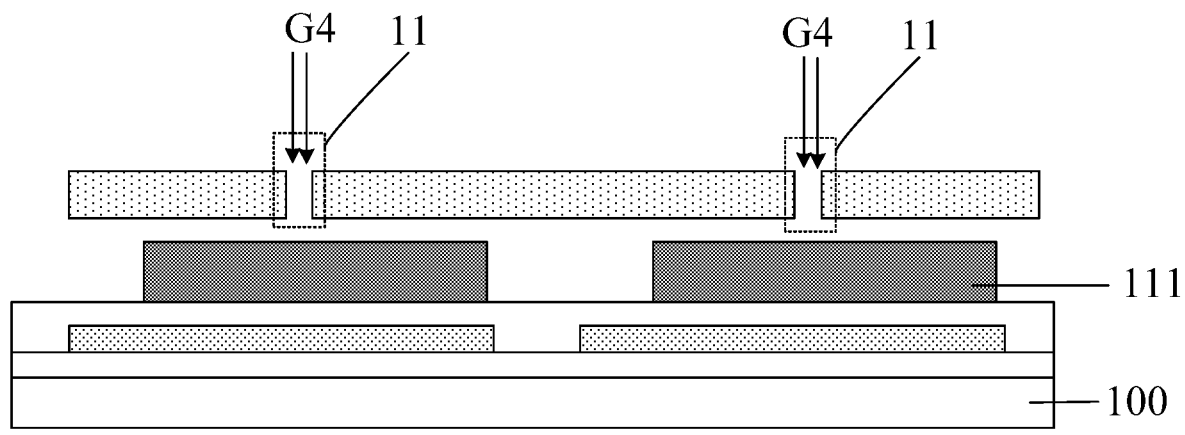
FIG. 9B is a schematic diagram of a sectional structure of the second mask plate and the base substrate shown in FIG. 9A in a direction AA'.
Figure 10A:
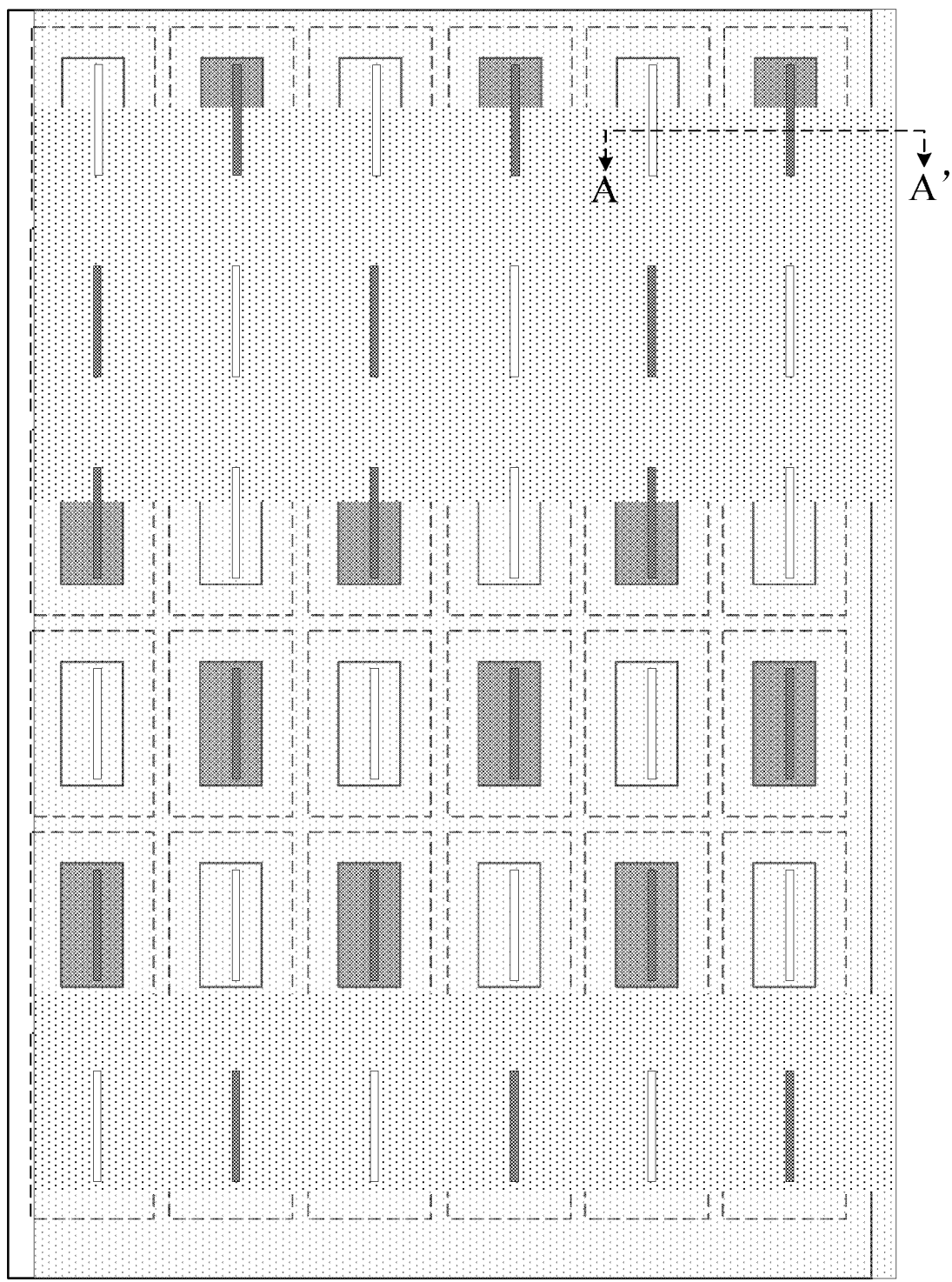
FIG. 10A is a schematic diagram of yet other top-view structures of a second mask plate and a base substrate in an embodiment of the present disclosure.
Figure 10B:
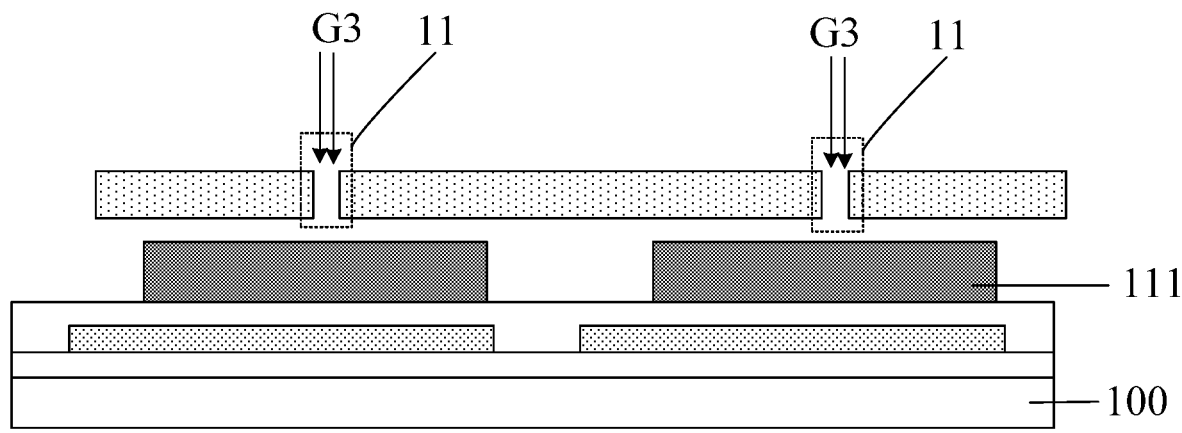
FIG. 10B is a schematic diagram of a sectional structure of the second mask plate and the base substrate shown in FIG. 10A in a direction AA'.
Figure 11A:
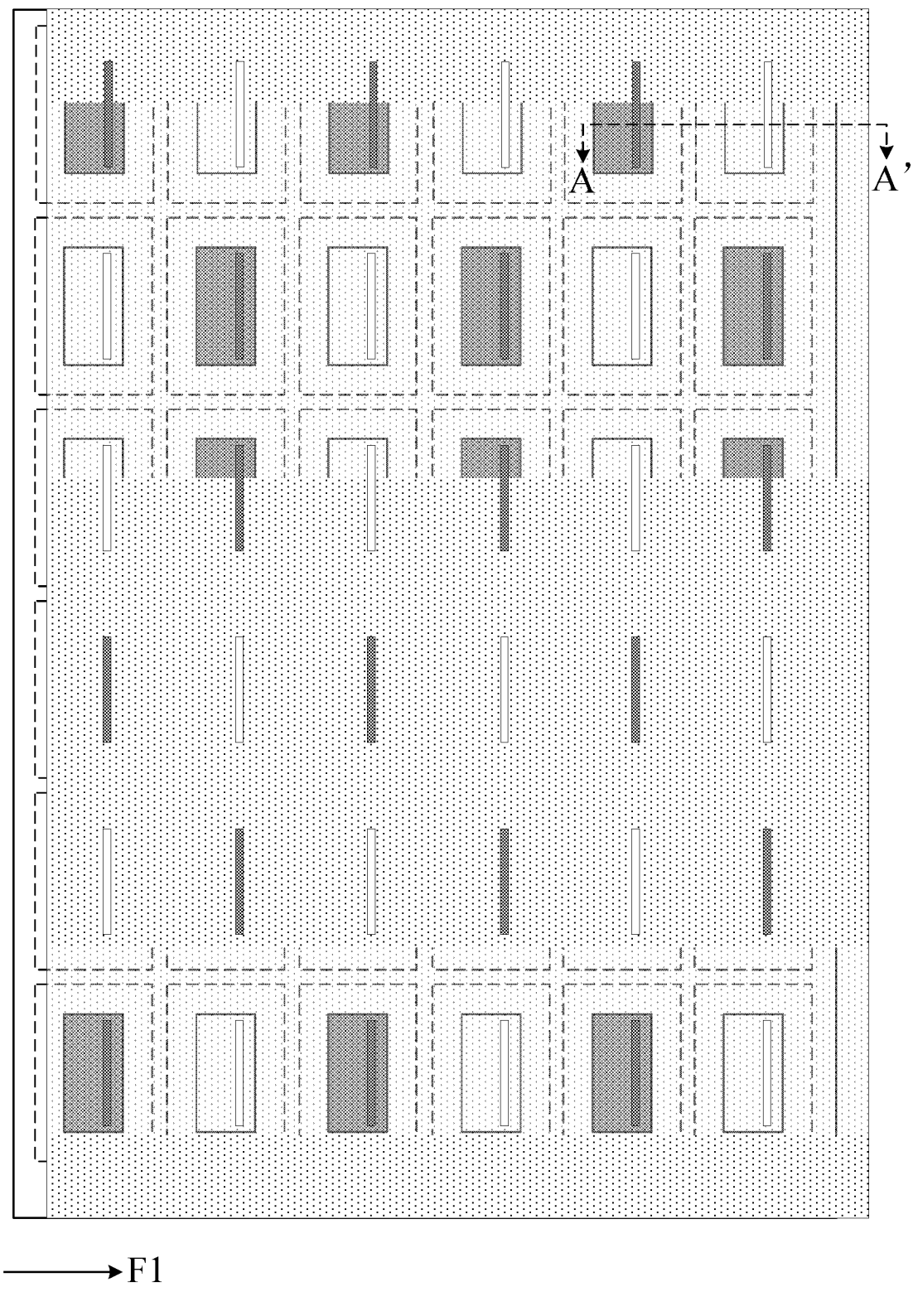
FIG. 11A is a schematic diagram of yet other top-view structures of a second mask plate and a base substrate in an embodiment of the present disclosure.
Figure 11B:
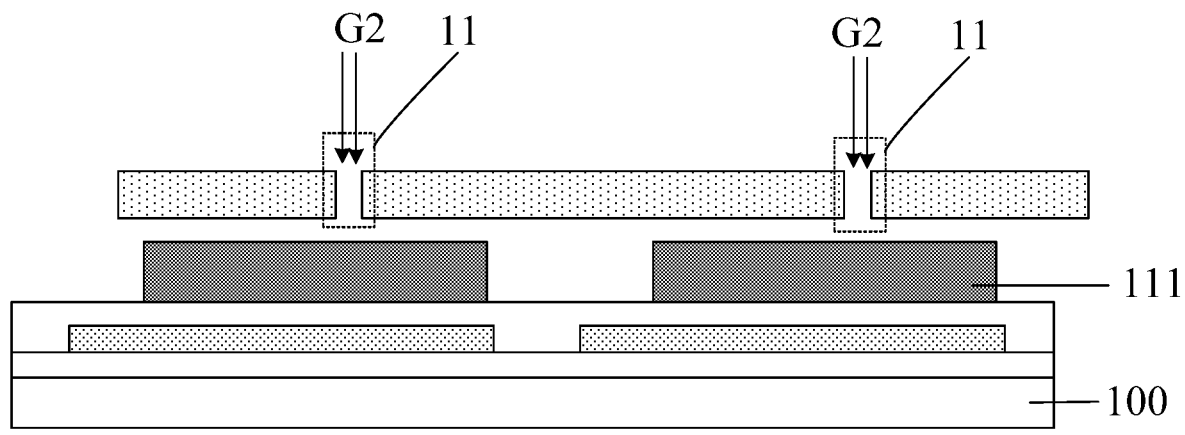
FIG. 11B is a schematic diagram of a sectional structure of the second mask plate and the base substrate shown in FIG. 11A in a direction AA'.
Figure 12A:
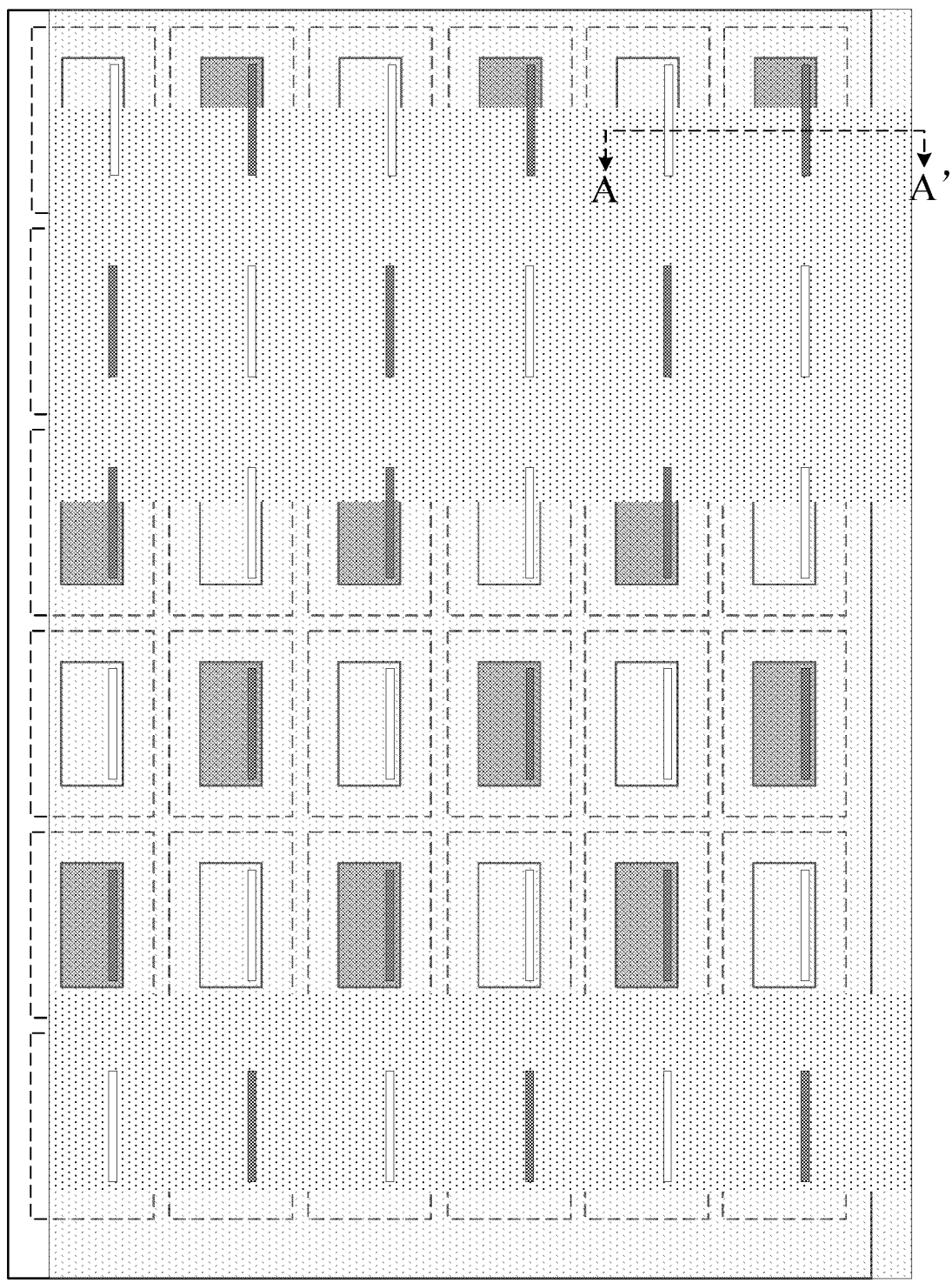
FIG. 12A is a schematic diagram of yet other top-view structures of a second mask plate and a base substrate in an embodiment of the present disclosure.
Figure 12B:
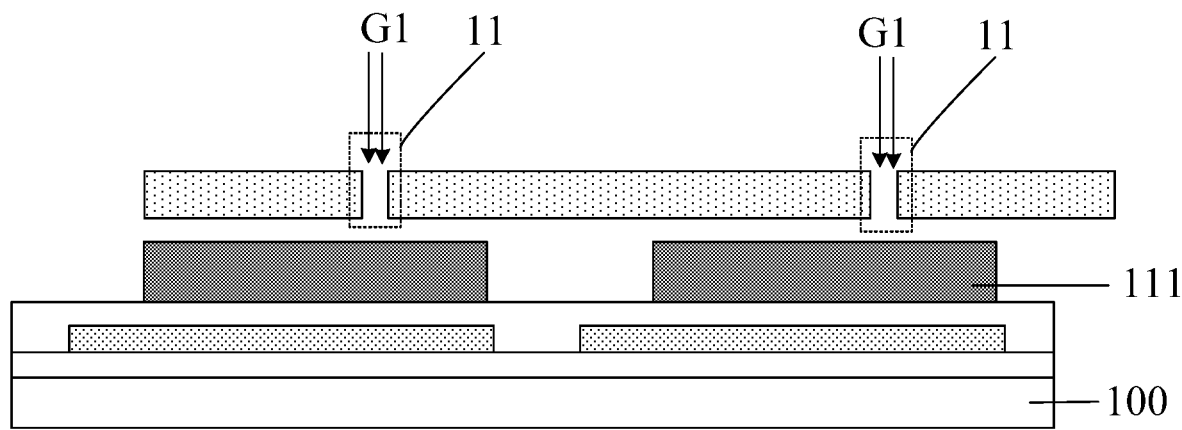
FIG. 12B is a schematic diagram of a sectional structure of the second mask plate and the base substrate shown in FIG. 12A in a direction AA'.

(6) The second mask plate is controlled to move along the row direction F1 of the sub-pixels spx according to the set stepping of controlling the second mask plate to move 2 microns each time, and exposing is carried out after each time of moving of the second mask plate is stopped according to the condition of sequentially decreasing the exposing light intensities. The second mask plate may be controlled to move for 5 times. For example, as shown in FIG. 7A and FIG. 7B, after the second mask plate 10 is disposed above the base substrate 100, exposing is carried out by adopting light with the exposing light intensity being G6. After that, as shown in FIG. 8A and FIG. 8B, the second mask plate 10 is controlled to move by 2 microns in the row direction F1 of the sub-pixels spx, and exposing is carried out by adopting light with the exposing light intensity being G5. After that, as shown in FIG. 9A and FIG. 9B, the second mask plate 10 is controlled to move by 2 microns in the row direction F1 of the sub-pixels spx, and exposing is carried out by adopting light with the exposing light intensity being G4. After that, as shown in FIG. 10A and FIG. 10B, the second mask plate 10 is controlled to move by 2 microns in the row direction F1 of the sub-pixels spx, and exposing is carried out by adopting light with the exposing light intensity being G3. After that, as shown in FIG. 11A and FIG. 11B, the second mask plate 10 is controlled to move by 2 microns in the row direction F1 of the sub-pixels spx, and exposing is carried out by adopting light with the exposing light intensity being G2. After that, as shown in FIG. 12A and FIG. 12B, the second mask plate 10 is controlled to move by 2 microns in the row direction F1 of the sub-pixels spx, and exposing is carried out by adopting light with the exposing light intensity being G1. In this case, G6>G5>G4>G3>G2>G1.

(7) The exposed base substrate 100 is developed, and the triangular concave structures 112 as shown in FIG. 2A may be formed on the sub-bearing layers 111.

(8) The plurality of reflecting structures 130 are formed on the side, facing away from the base substrate 100, of the bearing layer 110 through the composition process. A material of the reflecting structure 130 may be a metal material such as Al, Ag, Mo, etc., which is not limited here. In some embodiments, the reflecting structure 130 may be formed on second edge L2, and a width of the reflecting structure 130 in a direction parallel to the second edge L2 may be 12 microns.

(9) A first flat layer 160 is formed on side, facing away from the base substrate 100, of the plurality of reflecting structures 130, and therefore the impact of the concave structures 112 on arrangement of liquid crystal molecules may be lowered. In some embodiments, a thickness of the first flat layer 160 on the sub-bearing layers 111 may be 1 micron, and the first flat layer 160 at other positions may adopt a filling way to make a surface of a side, facing away from the base substrate, of the first flat layer be as flat as possible. For example, a thickness of the first flat layer 160 filling gaps between the sub-bearing layers 111 may be 7 microns.

(10) A first alignment layer 170 is formed on a side, facing away from the base substrate 100, of the first flat layer 160.

(11) An etch barrier layer 261 covering the light guide plate 210 is formed on the light guide plate 210 by adopting an IGZO material. In some embodiments, a thickness of the light guide plate is set to be 0.5 mm. A thickness of the etch barrier layer 261 is set to be 0.08 micron.

(12) A light extraction layer 220 is formed on a side, facing away from the light guide plate 210, of the etch barrier layer through the composition process. A material of the light extraction layer 220 may include a photoresist and $SiO_2$ dispersed in the photoresist. In some embodiments, a thickness of the light extraction layer 220 may be 0.8 micron.

Moreover, an auxiliary layer 264 may be further formed on the light extraction layer 220 by adopting a $SiO_2$ material to prevent damage of etching and peeling technologies on the upper surface of the light extraction layer 220. In some embodiments, a thickness of the auxiliary layer 264 may be 0.1 micron.

(13) A third flat layer 263 is formed on a side, facing away from the light guide plate 210, of the auxiliary layer 264. The third flat layer 263 covers the light guide plate 210, the light extraction layer 220 and the auxiliary layer 264 and fills openings of the light extraction layer 220. In some embodiments, a thickness of the third flat layer 263 on the auxiliary layer 264 may be 1.2 microns, and the third flat layer 263 at other positions may adopt a filling way to make a surface of a side, facing away from the light guide plate 210, of the third flat layer 263 be as flat as possible. For example, a thickness of the third flat layer 263 filling the openings of the light taking layer 220 may be 2.1 microns.

(14) A transparent common electrode layer 240 is formed on a side, facing away from the light guide plate 210, of the third flat layer 263 by adopting an ITO material. In some embodiments, a thickness of the transparent common electrode layer 240 may be 0.07 micron.

(15) A dielectric layer 265 is formed on a side, facing away from the light guide plate 210, of the transparent common electrode layer 240 by adopting a $SiO_2$ material. In some embodiments, a thickness of the dielectric layer 265 may be 0.12 micron.

(16) A black matrix layer 230 is formed on a side, facing away from the light guide plate 210, of the dielectric layer 265 through the composition process. In this way, light leakage can be prevented, that is, by providing the black matrix layer 230, it is possible to block not only impurity light reflected due to the uneven surfaces of the reflecting structures 130, but also stray light caused by the action of liquid crystal molecules. In some embodiments, a thickness of the black matrix layer 230 may be 1 micron.

(17) A second flat layer 262 is formed on a side, facing away from the light guide plate 210, of the black matrix layer 230. In some embodiments, a thickness of the second flat layer 262 on the black matrix layer 230 may be 1 micron, and the second flat layer 262 at other positions may adopt a filling way to make a surface of a side, facing away from the light guide plate, of the second flat layer 262 be as flat as possible.

(18) A second alignment layer 280 is formed on a side, facing away from the light guide plate 210, of the second flat layer 262.

(19) The base substrate 100 is bonded with the light guide substrate 200, after the liquid crystal layer 300 is formed between the base substrate 100 and the light guide substrate 200. Preferably, a thickness of the liquid crystal layer 300 is 30 microns.

It needs to be noted that steps (1) to (10) may be independently carried out from steps (11) to (18), and the order of steps (1) to (10) and steps (11) to (18) is not limited here.

An embodiment involving a specific structure and size relationship is described as follows: in combination with FIG. 5B, Table 1 shows: a thickness H1 (micron) of a liquid crystal layer 300, a thickness H2 (micron) of an etch barrier layer 261, a thickness H3 (micron) of a light extraction layer 220, a thickness H4 (micron) of an auxiliary layer 264, a thickness H5 (micron) of a third flat layer 263 on the auxiliary layer 264, a thickness H6 (micron) of a transparent common electrode layer 240, a thickness H7 (micron) of a dielectric layer 265, a thickness H8 (micron) of a black matrix layer 230, a thickness H9 (micron) of a second flat layer 262 on the black matrix layer 230, a thickness H10 (micron) of a first flat layer 160 on sub-bearing layers 111, a thickness H11 (micron) of the sub-bearing layer 111, and a thickness H12 (micron) of transparent pixel electrode 151.

TABLE 1

| H1 | H2 | H3 | H4 | H5 | H6 | H7 | H8 | H9 | H10 | H11 | H12 |
|---|---|---|---|---|---|---|---|---|---|---|---|
| 30 | 0.08 | 0.8 | 0.1 | 1.2 | 0.07 | 0.12 | 1 | 1 | 1 | 6 | 0.07 |

Figure 5B:
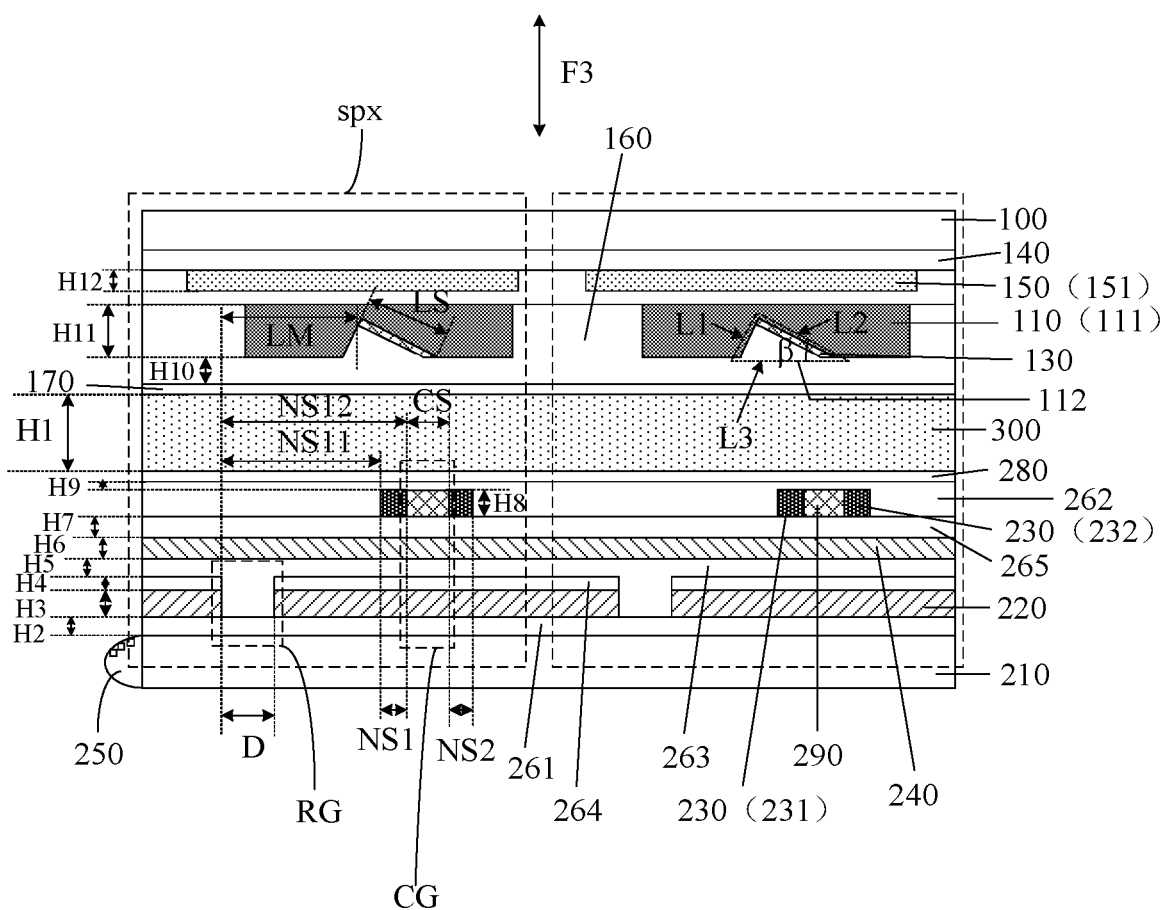
FIG. 5B is a schematic diagram of yet other sectional structures of the transparent display panel shown in FIG. 1 in the direction AA'.

In combination with FIG. 5B, Table 2 shows: refracting index n261 of the etch barrier layer 261, refracting index n220 of the light extraction layer 220, refracting index n264 of the auxiliary layer 264, refracting index n263 of the third flat layer 263, refracting index n240 of the transparent common electrode layer 240, refracting index n265 of the dielectric layer 265, refracting index n262 of the second flat layer 262, and refracting index n160 of the first flat layer 160. It needs to be noted that the first flat layer 160, the second flat layer 262 and the third flat layer 263 may be made of the same material, and their refracting indices vary within the range of 1.52±0.05 as the wavelength of light varies. It needs to be noted that except the film layers listed in Table 2, refracting index of other film layers may be not considered.

TABLE 2

| n261 | n220 | n264 | n263 | n240 | n265 | n262 | n160 |
|---|---|---|---|---|---|---|---|
| 1.5 | 1.25 | 1.52 | 1.52 | 1.5 | 1.52 | 1.52 | 1.52 |

In combination with FIG. 5B, Table 3 shows: in the same sub-pixel, a thickness H1 (micron) of the liquid crystal layer 300 in a direction F3, a width D (micron) of an opening of the light extraction layer 220 in a light entering region RG in a direction F1, an included angle β of a second edge L2 and a third edge L3 in a triangular cross section of a concave structure 112 in the row direction F1 parallel to the sub-pixel spx and the direction F3 perpendicular to a base substrate 100, a length LS (micron) of a reflecting structure 130 along the second edge L2, a distance LM (micron) between the left side of an orthographic projection of the opening of the light extraction layer 220 in the light entering region RG on the base substrate 100 (a side of the opening away from a light emitting region CG) and the left side of an orthographic projection of the reflecting structure 130 on the base substrate 100 (a side of the reflecting structure 130 closer to the light entering region RG) in the direction F1, a lighting effect L255 obtained when a transparent display panel displays a gray scale 255 (taking gray scales being from 0 to 255 as an example) (the lighting effect may be defined as a ratio of a light intensity of light emitted from the sub-pixel to a light intensity of light entering the light entering region RG of the sub-pixel from a light guide plate within a sub-pixel spx without a color film layer 290), a lighting effect L0 obtained when the transparent display panel displays a gray scale 0 (taking gray scales being from 0 to 255 as an example), a contrast ratio CR (L255/L0) of the display panel, and a resolution PPI of the transparent display panel. In some embodiments, in the direction F1, the black matrix layer 230 in one sub-pixel includes a first black sub-matrix 231 located on a side, close to the light entering region RG, of the color film layer 290, and a second black sub-matrix 232 located on a side, away from the light entering region RG, of the color film layer 290. Table 3 further shows a width NS1 (micron) of the first black sub-matrix 231, and a width CS (micron) of the light emitting region CG in the direction F1. That is, in the direction F1, a distance between a side, away from the light emitting region CG in one sub-pixel, of the orthographic projection of the opening of the light extraction layer 220 in the light entering region RG of the sub-pixel on the base substrate 100 and a side, close to the light entering region RG, of an orthographic projection of the first black sub-matrix 231 of the black matrix layer 230 of the sub-pixel on the base substrate 100 is a first distance NS11; and a distance between a side, away from the light emitting region CG, of the orthographic projection of the opening on the base substrate 100 and a side, away from the light entering region RG, of the orthographic projection of the first black sub-matrix 231 on the base substrate 100 is a second distance NS12, and a difference value between NS12 and NS11 is NS1. In some embodiments, in the direction F1, a width NS2 of the second black sub-matrix 232 of the black matrix layer 230 in one sub-pixel may be set to range from 20 to 50 microns. For example, NS2 may be 20 microns, or 30 microns or 50 microns.

TABLE 3

| H1 | D | β | LS | LM | L255 | L0 | CR | PPI | NS12-NS11 (NS1) | CS |
|---|---|---|---|---|---|---|---|---|---|---|
| 30 | 15 | 32 | 12 | 87.5 | 43% | 0.15% | 284.3125 | 240 | 82.3-22.5 | 25.7 |
| 30 | 16 | 32 | 12 | 88.0 | 43% | 0.131% | 330.7636 | 240 | 85.9-23.5 | 22.1 |
| 30 | 17 | 32 | 12 | 88.5 | 44% | 0.119% | 371.5463 | 237 | 86.4-24.5 | 22.6 |
| 30 | 18 | 32 | 12 | 89.0 | 45% | 0.11% | 407.1876 | 237 | 86.8-25.5 | 22.2 |
| 30 | 19 | 32 | 12 | 89.6 | 45% | 0.104% | 438.1806 | 235 | 87.2-26.5 | 22.8 |
| 30 | 20 | 32 | 12 | 90.1 | 46% | 0.986% | 464.9842 | 233 | 87.6-27.5 | 23.4 |
| 30 | 21 | 32 | 12 | 90.6 | 46% | 0.937% | 488.0237 | 233 | 88.0-28.5 | 23 |
| 30 | 22 | 32 | 12 | 91.0 | 46% | 0.898% | 507.69 | 231 | 88.4-29.5 | 23.6 |
| 30 | 23 | 32 | 12 | 91.5 | 46% | 0.869% | 524.3403 | 231 | 88.8-30.5 | 23.2 |

TABLE 3-continued

| H1 | D | β | LS | LM | L255 | L0 | CR | PPI | NS12-NS11 (NS1) | CS |
|---|---|---|---|---|---|---|---|---|---|---|
| 30 | 24 | 32 | 12 | 92.0 | 46% | 0.845% | 538.2978 | 231 | 89.2-31.5 | 22.8 |
| 30 | 25 | 32 | 12 | 92.5 | 45% | 0.827% | 549.8516 | 229 | 89.6-32.5 | 23.4 |
| 30 | 26 | 32 | 12 | 93.0 | 45% | 0.813% | 559.257 | 229 | 90.0-33.5 | 23 |
| 30 | 27 | 32 | 12 | 93.5 | 46% | 0.803% | 566.7352 | 227 | 90.4-34.5 | 23.6 |
| 30 | 28 | 32 | 12 | 94.0 | 46% | 0.796% | 572.4734 | 227 | 90.8-35.5 | 23.2 |
| 30 | 29 | 32 | 12 | 94.5 | 46% | 0.791% | 576.625 | 225 | 91.1-36.5 | 23.9 |
| 30 | 30 | 32 | 12 | 94.9 | 46% | 0.788% | 579.3092 | 225 | 91.5-37.5 | 23.5 |

The width D of the opening in the light entering region RG in the direction F1 may be gradually increased with the distance from a light source structure 250 being increased, so that the light guide plate can uniformly emit light. When the width D of the opening in the RG varies in the direction F1, the structural size of the sub-pixel spx may be adjusted through the parameters in the above table, and the included angle β does not need to be adjusted to make light intensities of different light emitting regions CG corresponding to the gray scale 255 be consistent or approximately consistent, so that the display uniformity of the display panel is improved.

It needs to be noted that the positions of all technical features and the refracting index limited in Table 1, Table 2 and Table 3 are merely illustrated, and when display panels disclosed in some embodiments of the present disclosure are designed, it may not be limited to the above sizes and refracting index.

Based on the same inventive concept, an embodiment of the present disclosure further provides a display device, including the transparent display panel provided by the embodiment of the present disclosure. The principle for solving problems of the display device is similar to the aforementioned transparent display panel, and thus implementation of the display device may refer to implementation of the aforementioned transparent display panel, and repeated parts are omitted herein.

During specific implementation, in the embodiment of the present disclosure, the display device may be: a mobile phone, a tablet computer, a television, a display, a laptop, a digital photo frame, a navigator and any product or component with a display function. Other essential components of the display device shall be understood by those of ordinary skill in the art, and is omitted herein and also shall not become a restriction to the present disclosure.

According to the transparent display panel, the preparation method thereof and the display device provided by the embodiments of the present disclosure, the bearing layer with the concave structures is disposed, the plurality of reflecting structures are disposed on the side, facing the liquid crystal layer, of the bearing layer, and thus light entering the reflecting structures from the light guide substrate can be reflected and then emitted from the light emitting regions. Therefore, the liquid crystal display panel may achieve the transparent display effect.

Apparently, those skilled in the art can make various modifications and variations to the present disclosure without departing from the spirit and scope of the present disclosure. In this way, under the condition that these modifications and variations of the present disclosure fall within the scope of the claims of the present disclosure and their equivalent technologies, the present disclosure is also intended to include these modifications and variations.

What is claimed is:

1. A transparent display panel, comprising a plurality of sub-pixels, and further comprising:
a base substrate;
a light guide substrate, arranged opposite to the base substrate, and comprising:
   a plurality of light entering regions, and
   a plurality of light emitting regions spaced from the plurality of light entering regions,
   wherein each sub-pixel comprises one light entering region and one light emitting region, different sub-pixels comprise different light entering regions and different light emitting regions;
a liquid crystal layer, disposed between the base substrate and the light guide substrate;
a bearing layer, disposed between the base substrate and the liquid crystal layer, and comprising:
   a plurality of concave structures spaced from each other, disposed on a side of the bearing layer facing the liquid crystal layer,
   wherein each sub-pixel comprises one concave structure, different sub-pixels comprise different concave structures, no bearing layer is disposed between adjacent sub-pixels; and a thickness of the bearing layer in a direction perpendicular to the base substrate ranges from 4 to 8 microns; and
a plurality of reflecting structures, disposed on a side of the concave structures facing the liquid crystal layer,
wherein an orthographic projection of the concave structures on the base substrate covers an orthographic projection of the reflecting structures on the base substrate;
wherein in a sub-pixel,
the reflecting structure on the concave structure comprised in the sub-pixel reflect incident light to obtain emitted light, so that the emitted light is emitted by penetrating through the light emitting region comprised in the sub-pixel;
the incident light is incident on the reflecting structure, through the liquid crystal layer, from the light entering region comprised in the sub-pixel;
a cross section, in a direction parallel to a row of the plurality of sub-pixels and perpendicular to the base substrate, of the concave structure comprised in the sub-pixel is a triangle; the triangle has a first edge, a second edge and a third edge connected in sequence; the first edge and the second edge are located at side edges of the concave structure, and the third edge is located at an opening of the concave structure; a length of the second edge is greater than a length of the first edge; an included angle between the second edge and the third edge ranges from 20° to 40°;
the reflecting structure is disposed only on the second edge of the concave structure; and a length of the reflecting structure along the second edge is 12 microns.

2. The transparent display panel of claim 1, wherein the bearing layer comprises a plurality of sub-bearing layers disposed at intervals;
each sub-pixel comprises one sub-bearing layer; and
an orthographic projection of the sub-bearing layer on the base substrate covers the orthographic projection of the concave structure on the base substrate.

3. The transparent display panel of claim 2, wherein a material of the bearing layer is a photoresist with light shading performance.

4. The transparent display panel of claim 2, further comprising:
a transistor layer disposed between the base substrate and the bearing layer, and comprising a plurality of thin film transistors; and
a driving electrode layer disposed between the transistor layer and the bearing layer, and comprising a plurality of transparent pixel electrodes;
wherein each sub-pixel comprises a thin film transistor and a transparent pixel electrode, and in a same sub-pixel, the thin film transistor and the transparent pixel electrode are electrically connected to each other.

5. The transparent display panel of claim 4, wherein:
in a same sub-pixel, the orthographic projection of the sub-bearing layer on the base substrate covers an orthographic projection of the thin film transistor on the base substrate;
and/or in a same sub-pixel, an orthographic projection of the transparent pixel electrode on the base substrate covers the orthographic projection of the sub-bearing layer on the base substrate.

6. The transparent display panel of claim 1, further comprising:
a first flat layer disposed between the plurality of reflecting structures and the liquid crystal layer, wherein the first flat layer covers the base substrate and the bearing layer, and fills the plurality of concave structures.

7. The transparent display panel of claim 1, wherein the light guide substrate comprises:
a light guide plate disposed on a side, facing away from the base substrate, of the liquid crystal layer;
a light extraction layer disposed between the light guide plate and the liquid crystal layer, wherein
the light extraction layer comprises a plurality of openings arranged at intervals, and
an orthographic projection of one opening on the base substrate is located within one light entering region;
a transparent common electrode layer disposed between the light extraction layer and the liquid crystal layer;
a black matrix layer disposed between the transparent common electrode layer and the liquid crystal layer, wherein
an orthographic projection of the black matrix layer on the base substrate overlaps with an orthographic projection of a gap between two light emitting regions on the base substrate, and
an overlapping area between the orthographic projection of the black matrix layer on the base substrate and an orthographic projection of the light entering region on the base substrate is 0; and
a light source structure located on one side of the light guide plate.

8. A preparation method of the transparent display panel of claim 1, comprising:
forming the bearing layer above the base substrate, wherein:
the bearing layer comprises the plurality of concave structures,
the base substrate comprises the plurality of sub-pixels, and
each sub-pixel comprises a concave structure;
forming the plurality of reflecting structures on a side, facing away from the base substrate, of the bearing layer, wherein:
an orthographic projection of the concave structure on the base substrate covers an orthographic projection of the reflecting structure on the base substrate;
forming the liquid crystal layer between the base substrate and the light guide substrate, wherein:
the light guide substrate comprises the plurality of light entering regions and the plurality of light emitting regions spaced from the plurality of light entering regions; and
each sub-pixel comprises a light entering region and a light emitting region;
bonding the base substrate with the light guide substrate;
wherein in a same sub-pixel,
one or more reflecting structures reflect incident light to obtain emitted light, so that the emitted light is emitted by penetrating through the light emitting region of the light guide substrate; and
the incident light is incident on the one or more reflecting structures, through the liquid crystal layer, from the light entering region of the light guide substrate.

9. The preparation method of claim 8, wherein forming the bearing layer above the base substrate comprises:
forming a bearing thin film layer above the base substrate by adopting a photoresist with light shading performance;
exposing and developing the bearing thin film layer by adopting a first mask plate to form a plurality of sub-bearing layers disposed at intervals, wherein each sub-pixel comprises one sub-bearing layer;
exposing each sub-bearing layer multiple times by adopting a second mask plate, with a different exposing light intensity for each time; and
forming the concave structure on the each sub-bearing layer after developing.

10. The preparation method of claim 9, wherein exposing each sub-bearing layer multiple times by adopting a second mask plate, with a different exposing light intensity for each time comprises:
disposing the second mask plate having a plurality of slits spaced apart from each other on a side, facing away from the base substrate, of the bearing layer, wherein one sub-bearing layer corresponds to one slit;
moving, using a set stepping, the second mask plate in a direction of a row of the plurality of sub-pixels; and
exposing, according to a condition of sequentially increasing exposing light intensities, the each sub-bearing layer after each time of moving of the second mask plate is stopped; and
developing the exposed base substrate, and forming the concave structure on each sub-bearing layer.

11. A display device, comprising a transparent display panel, wherein the transparent display panel comprises a plurality of sub-pixels, and further comprises:
  a base substrate;
  a light guide substrate, arranged opposite to the base substrate, and comprising:
    a plurality of light entering regions, and
    a plurality of light emitting regions spaced from the plurality of light entering regions,
    wherein each sub-pixel comprises one light entering region and one light emitting region, different sub-pixels comprise different light entering regions and different light emitting regions;
  a liquid crystal layer, disposed between the base substrate and the light guide substrate;
  a bearing layer, disposed between the base substrate and the liquid crystal layer, and comprising:
    a plurality of concave structures spaced from each other, disposed on a side of the bearing layer facing the liquid crystal layer,
    wherein each sub-pixel comprises one concave structure, different sub-pixels comprise different concave structures, no bearing layer is disposed between adjacent sub-pixels; and a thickness of the bearing layer in a direction perpendicular to the base substrate ranges from 4 to 8 microns; and
  a plurality of reflecting structures, disposed on a side of the concave structures facing the liquid crystal layer,
  wherein an orthographic projection of the concave structures on the base substrate covers an orthographic projection of the reflecting structures on the base substrate;
  wherein in a sub-pixel,
  the reflecting structure on the concave structure comprised in the sub-pixel reflect incident light to obtain emitted light, so that the emitted light is emitted by penetrating through the light emitting region comprised in the sub-pixel;
  the incident light is incident on the reflecting structure, through the liquid crystal layer, from the light entering region comprised in the sub-pixel;
  a cross section, in a direction parallel to a row of the plurality of sub-pixels and perpendicular to the base substrate, of the concave structure comprised in the sub-pixel is a triangle; the triangle has a first edge, a second edge and a third edge connected in sequence; the first edge and the second edge are located at side edges of the concave structure, and the third edge is located at an opening of the concave structure; a length of the second edge is greater than a length of the first edge; an included angle between the second edge and the third edge ranges from 20° to 40°,
  the reflecting structure is disposed only on the second edge of the concave structure;
  and a length of the reflecting structure along the second edge is 12 microns.

12. The display device of claim 11, wherein the bearing layer comprises a plurality of sub-bearing layers disposed at intervals; each sub-pixel comprises one sub-bearing layer, and
an orthographic projection of the sub-bearing layer on the base substrate covers the orthographic projection of the concave structure on the base substrate.

13. The display device of claim 12, wherein a material of the bearing layer is a photoresist with light shading performance.

14. The display device of claim 12, wherein the transparent display panel further comprises:
  a transistor layer disposed between the base substrate and the bearing layer, and comprising a plurality of thin film transistors; and
  a driving electrode layer disposed between the transistor layer and the bearing layer, and comprising a plurality of transparent pixel electrodes;
  wherein each sub-pixel comprises a thin film transistor and a transparent pixel electrode, and in a same sub-pixel, the thin film transistor and the transparent pixel electrode are electrically connected to each other.

15. The display device of claim 14, wherein:
  in a same sub-pixel, the orthographic projection of the sub-bearing layer on the base substrate covers an orthographic projection of the thin film transistor on the base substrate; and/or
  in a same sub-pixel, an orthographic projection of the transparent pixel electrode on the base substrate covers the orthographic projection of the sub-bearing layer on the base substrate.

16. The display device of claim 11, wherein the transparent display panel further comprises:
  a first flat layer disposed between the plurality of reflecting structures and the liquid crystal layer, wherein the first flat layer covers the base substrate and the bearing layer, and fills the plurality of concave structures.

17. The display device of claim 11, wherein the light guide substrate comprises:
  a light guide plate disposed on a side, facing away from the base substrate, of the liquid crystal layer;
  a light extraction layer disposed between the light guide plate and the liquid crystal layer, wherein
    the light extraction layer comprises a plurality of openings arranged at intervals, and
    an orthographic projection of one opening on the base substrate is located within one light entering region;
  a transparent common electrode layer disposed between the light extraction layer and the liquid crystal layer;
  a black matrix layer disposed between the transparent common electrode layer and the liquid crystal layer, wherein
    an orthographic projection of the black matrix layer on the base substrate overlaps with an orthographic projection of a gap between two light emitting regions on the base substrate, and
    an overlapping area between the orthographic projection of the black matrix layer on the base substrate and an orthographic projection of the light entering region on the base substrate is 0; and
  a light source structure located on one side of the light guide plate.

* * * * *